US007742870B2

(12) United States Patent
Yoshikawa

(10) Patent No.: US 7,742,870 B2
(45) Date of Patent: Jun. 22, 2010

(54) AIR-FUEL RATIO CONTROL DEVICE OF INTERNAL COMBUSTION ENGINE

(75) Inventor: Hisayo Yoshikawa, Nagoya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 12/265,775

(22) Filed: Nov. 6, 2008

(65) Prior Publication Data

US 2009/0125214 A1 May 14, 2009

(30) Foreign Application Priority Data

Nov. 8, 2007 (JP) ............................ 2007-290270

(51) Int. Cl.
*B60T 7/12* (2006.01)
*F02D 41/00* (2006.01)

(52) U.S. Cl. ...................................... 701/108; 123/674

(58) Field of Classification Search ................. 701/103, 701/104, 105, 108, 109, 114, 115; 123/694, 123/695, 696, 674, 675
See application file for complete search history.

(56) References Cited

U.S. PATENT DOCUMENTS

| | | | | |
|---|---|---|---|---|
| 5,797,384 | A | 8/1998 | Kitagawa et al. | |
| 5,931,143 | A | 8/1999 | Kitagawa et al. | |
| 5,937,638 | A * | 8/1999 | Akazaki et al. | 60/274 |
| 6,370,473 | B1 * | 4/2002 | Yasui et al. | 701/109 |
| 6,449,944 | B1 * | 9/2002 | Yasui et al. | 60/277 |
| 6,591,822 | B2 | 7/2003 | Dohta | |
| 6,718,252 | B2 | 4/2004 | Kawai et al. | |
| 2003/0024514 | A1 * | 2/2003 | Kitamura et al. | 123/672 |
| 2003/0093989 | A1 * | 5/2003 | Ueno et al. | 60/277 |
| 2004/0193358 | A1 * | 9/2004 | Yasui | 701/109 |

FOREIGN PATENT DOCUMENTS

| | | |
|---|---|---|
| JP | 2007-009708 | 1/2007 |
| JP | 2007-009713 | 1/2007 |
| JP | 2007-187129 | 7/2007 |

* cited by examiner

*Primary Examiner*—John T Kwon
(74) *Attorney, Agent, or Firm*—Nixon & Vanderhye P.C.

(57) ABSTRACT

A dead time in the case where an output of an air-fuel ratio sensor changes in a lean direction and a dead time in the case where the output changes in a rich direction are sensed respectively. The number of elements constituting data of past feedback correction amounts used for calculating a present feedback correction amount is changed in accordance with the larger one of the dead times. A lean direction response time and a rich direction response time are sensed respectively. A control gain is corrected in accordance with the lean direction response time when the output of the air-fuel ratio sensor changes in the lean direction. The control gain is corrected in accordance with the rich direction response time when the output changes in the rich direction.

14 Claims, 17 Drawing Sheets

AIR-FUEL RATIO CONTROL DEVICE OF INTERNAL COMBUSTION ENGINE

CROSS REFERENCE TO RELATED APPLICATION

This application is based on and incorporates herein by reference Japanese Patent Application No. 2007-290270 filed on Nov. 8, 2007.

BACKGROUND OF THE INVENTION

1. Field of the Invention

The present invention relates to an air-fuel ratio control device of an internal combustion engine that performs feedback control of a fuel quantity injected into the internal combustion engine based on a sensing value of an air-fuel ratio sensor sensing an air-fuel ratio of exhaust gas of the internal combustion engine.

2. Description of Related Art

A recent electronically-controlled automobile has an air-fuel ratio sensor arranged in an exhaust pipe for sensing an air-fuel ratio or an oxygen concentration of exhaust gas of an internal combustion engine. Feedback control of a fuel quantity (or an air-fuel ratio of a mixture gas) injected into the internal combustion engine is performed to maintain the air-Fuel ratio of the exhaust gas to the vicinity of a target air-fuel ratio based on the output of the air-fuel ratio sensor. Thus, exhaust emission and fuel consumption are improved. In such the air-fuel ratio feedback control system, if a response characteristic of the air-fuel ratio sensor sensing the air-fuel ratio of the exhaust gas is degraded, sensing accuracy of the air-fuel ratio is deteriorated and air-fuel ratio control accuracy is deteriorated, leading to deterioration of the exhaust emission and the like.

As measures against such the problem, there is a system (for example, as described in Patent document 1: Japanese patent No. 3581737) that determines presence/absence of degradation of a response characteristic of an air-fuel ratio sensor based on an adaptation parameter used for feedback control and decreases a gain of the feedback control if the degradation of the response characteristic of the air-fuel ratio sensor is detected through the determination.

In general, the air-fuel ratio feedback control system is designed by modeling a dynamic characteristic of a control object since a fuel supply quantity to an engine is changed until an output of an air-fuel ratio sensor changes using a dead time plus a first-order lag characteristic (a response time). In order to meet the exhaust gas regulations (i.e., demands for low emission), which will become more and more severe in the future, it has been increasingly required to reduce the deterioration of the air-fuel ratio control accuracy due to the degradation of the dead time or the degradation of the response time.

The degradation of the dead time and the degradation of the response time occur respectively and individually, and the degradation of one of them can advance ahead of the other. Therefore, it is difficult to perform the feedback control corresponding to the degradation of the dead time or the degradation of the response time only by decreasing the gain of the feedback control when the degradation of the response characteristic of the air-fuel ratio sensor is detected as described in above Patent document 1.

Recently, it has been found out that the degradation of the response characteristic of the air-fuel ratio sensor occurs asymmetrically between a rich side and a lean side of the air-fuel ratio. Therefore, a certain technology (e.g., refer to Patent document 2: JP-A-2007-187129) senses a dead time and a time constant (i.e., a response time) of an air-fuel ratio sensor on both of the rich side and the lean side respectively and separately. An average value of the sensing values on the rich side and an average value of the sensing values on the lean side are calculated respectively and compared with reference values respectively, thereby detecting degradation of the air-fuel ratio sensor.

The technology described in Patent document 2 only performs the degradation diagnosis of the air-fuel ratio sensor by detecting the asymmetrical degradation of the air-fuel ratio sensor between the rich side and the lean side but does not have any function to reflect the detection result of the asymmetrical degradation in the feedback control. Therefore, the technology cannot reduce the deterioration of the air-fuel ratio control accuracy due to the asymmetrical degradation.

SUMMARY OF THE INVENTION

It is an object of the present invention to provide an air-fuel ratio control device of an internal combustion engine capable of reducing deterioration of air-fuel ratio control accuracy due to degradation of a dead time of a control object or asymmetrical degradation of an air-fuel ratio sensor between a rich side and a lean side.

According to an aspect of the present invention, an air-fuel ratio control device of an internal combustion engine has an air-fuel ratio feedback control section, a storage section, and a dead time sensing section. The air-fuel ratio feedback control section performs feedback control of a fuel quantity injected into the internal combustion engine based on a sensing value of an air-fuel ratio sensor sensing an air-fuel ratio of exhaust gas of the internal combustion engine The storage section stores data of past feedback correction amounts calculated by the air-fuel ratio feedback control section in a chronological order. The dead time sensing section senses a dead time necessary for change in the fuel quantity injected into the internal combustion engine to appear as change in an output of the air-fuel ration sensor.

The air-fuel ratio feedback control section calculates a present feedback correction amount by using the data of the past feedback correction amounts stored in the storage section, the sensing value of the air-fuel ratio sensor and a target air-fuel ratio. The air-fuel ratio feedback control section includes a changing section for changing the number of elements constituting the data of the past feedback correction amounts used for calculating the present feedback correction amount in accordance with the dead time sensed by the dead time sensing section.

With such the construction, it is possible to perform control for stabilizing the feedback control by increasing the number of the elements constituting the data of the past feedback correction amounts as the degradation of the dead time advances more. As a result, deterioration of the air-fuel ratio control accuracy due to the degradation of the dead time can be reduced.

In order to simplify the calculation processing, the present invention may be constructed to sense the dead time without considering the asymmetrical degradation of the dead time between the rich side and the lean side.

Alternatively, according to another aspect of the present invention, the dead time sensing section senses the dead time in the case where the output of the air-fuel ratio sensor changes from a rich side to a lean side and the dead time in the case where the output of the air-fuel ratio sensor changes from the lean side to the rich side respectively. The air-fuel ratio feedback control section selects the larger one of the two dead times sensed by the dead time sensing section and changes the number of the elements constituting the data of the past feedback correction amounts used for calculating the present feedback correction amount in accordance with the larger dead time.

With such the construction, the feedback correction amount can be calculated in consideration of the asymmetrical degradation of the dead time between the rich side and the lean side. Accordingly, the deterioration of the air-fuel ratio control accuracy due to the asymmetrical degradation of the dead time between the rich side and the lean side can be reduced.

According to another aspect of the present invention, the air-fuel ratio control device further has a dead time degradation degree determining section for determining a degradation degree of the dead time sensed by the dead time sensing section. When the degradation degree of the dead time determined by the dead time degradation degree determining section is equal to or less than a predetermined determination threshold value, the air-fuel ratio feedback control section sets the number of the elements constituting the data of the past feedback correction amounts used for calculating the present feedback correction amount to a value corresponding to an initial characteristic.

With such the construction, the number of the elements constituting the data of the past feedback correction amounts used for calculating the present feedback correction amount can be fixed to the value corresponding to the initial characteristic when the degradation degree of the dead time is small and a difference from the initial characteristic is small. Thus, unnecessary change of the number of the elements constituting the data of the past feedback correction amounts can be avoided.

According to another aspect of the present invention, the air-fuel ratio control device further has a response time sensing section for sensing a response time of the air-fuel ratio sensor and a control gain correcting section for correcting a control gain of the feedback control performed by the air-fuel ratio feedback control section in accordance with the response time sensed by the response time sensing section. The response time sensing section senses a lean direction response time, which is a response time in the case where the output of the air-fuel ratio sensor changes from a rich side to a lean side, and a rich direction response time, which is a response time in the case where the output of the air-fuel ratio sensor changes from the lean side to the rich side, respectively. The control gain correcting section corrects the control gain in accordance with the lean direction response time when the output of the air-fuel ratio sensor changes from the rich side to the lean side. The control gain correcting section corrects the control gain in accordance with the rich direction response time when the output of the air-fuel ratio sensor changes from the lean side to the rich side.

With such the construction, the control gain can be corrected differently between the rich side and the lean side in response to the asymmetrical degradation of the response time of the air-fuel ratio sensor between the rich side and the lean side. As a result, the deterioration of the air-fuel ratio control accuracy due to the asymmetrical degradation of the response time of the air-fuel ratio sensor between the rich side and the lean side can be reduced.

In this case, according to another aspect of the present invention, the air-fuel ratio control device further has a response time degradation degree determining section for determining a degradation degree of each of the response times sensed by the response time sensing section. When the degradation degree of the response time is equal to or less than a predetermined determination threshold value, the control gain correcting section sets the control gain to a value corresponding to an initial characteristic.

With such the construction, the control gain can be fixed to the value corresponding to the initial characteristic when the degradation degree of the response time is small and a difference from the initial characteristic is small. Thus, unnecessary change of the control gain can be avoided.

As the method of determining a change direction of the output of the air-fuel ratio sensor, a method of determining the change direction of the output of the air-fuel ratio sensor between the rich side and the lean side based on whether a difference value between the present output and the previous output of the air-fuel ratio sensor is positive or negative may be used.

Alternatively, according to yet another aspect of the present invention, the control gain correcting section determines the change direction of the output of the air-fuel ratio sensor between the rich side and the lean side based on whether a differential value or a second-order differential value of the output of the air-fuel ratio sensor is positive or negative. With such the construction, the change direction of the air-fuel ratio between the rich side and the lean side can be easily determined.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

Figure 1:
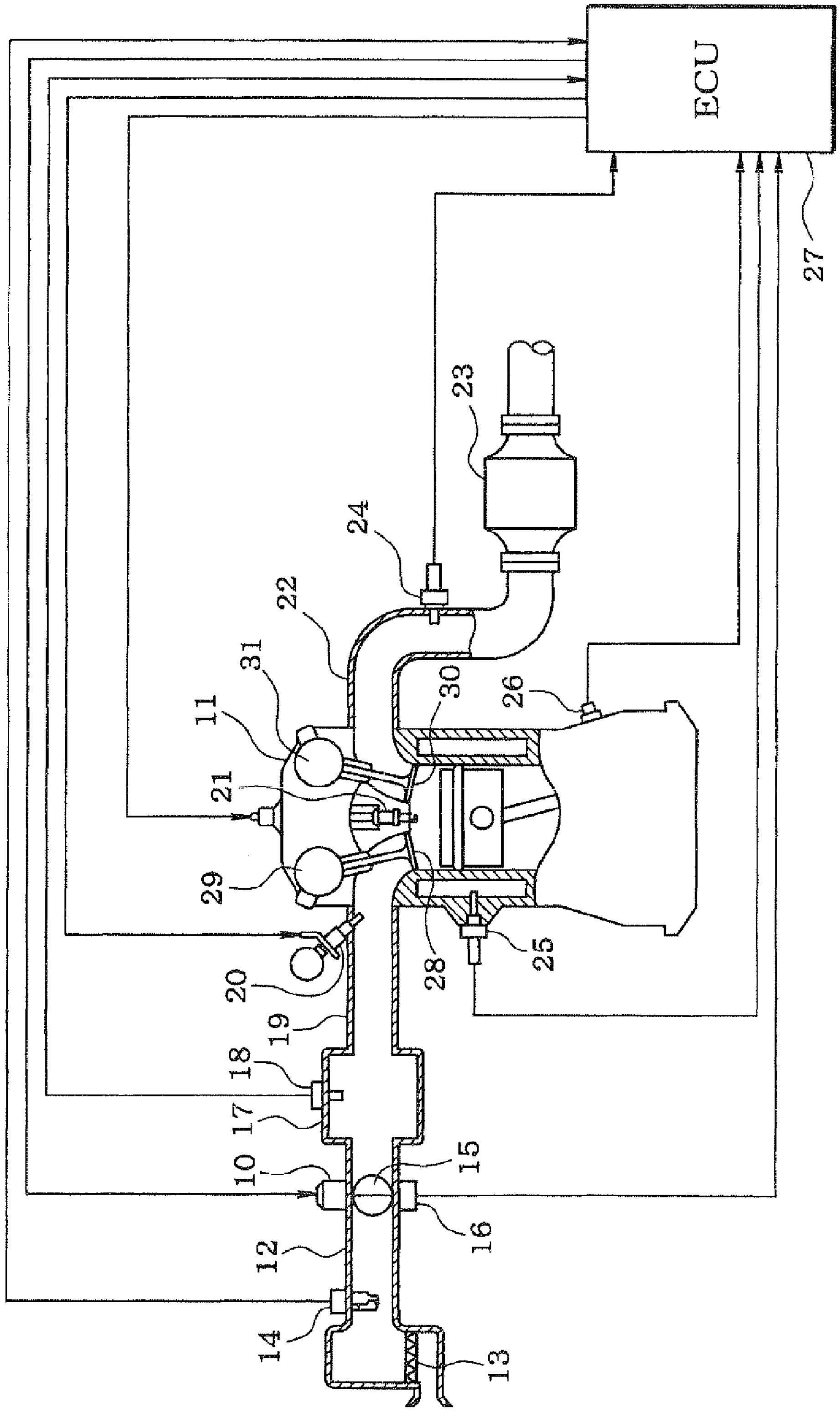
FIG. 1 is a schematic configuration diagram showing an entire engine control system according to an embodiment of the present invention.

An embodiment of the present invention will be hereinafter described with reference to the accompanying drawings. First, a schematic configuration of an entire engine control system is described with reference to FIG. 1.

An air cleaner 13 is provided in the most upstream portion of an intake pipe 12 of an engine 11 (an internal combustion engine) and an airflow meter 14 for sensing an intake air quantity is provided downstream of the air cleaner 13. A throttle valve 15, whose opening degree is adjusted by a motor 10, and a throttle position sensor 16 for sensing a throttle position of the throttle valve 15 are provided downstream of the air flow meter 14.

Further, a surge tank 17 is provided downstream of the throttle valve 15 and an intake pipe pressure sensor 18 for sensing intake pipe pressure is provided to the surge tank 17. An intake manifold 19 for introducing air into each cylinder of the engine 11 is provided to the surge tank 17, and an injector 20 for injecting fuel is attached to the vicinity of an intake port of the intake manifold 19 for each cylinder. A spark plug 21 is attached to a cylinder head of the engine 11 for each cylinder. A mixture gas in the cylinder is ignited by spark discharge of each spark plug 21.

A variable intake valve timing mechanism 29 is provided to an intake valve 28 of the engine 11 for varying opening/closing timing of the intake valve 28 (intake valve timing). A variable exhaust valve timing mechanism 31 is provided to an exhaust valve 30 for varying opening/closing timing of the exhaust valve 30 (exhaust valve timing).

A catalyst 23 such as a three-way catalyst is provided in an exhaust pipe 22 of the engine 11 for purifying CO, HC, NOx and the like in the exhaust gas. An air-fuel ratio sensor 24 for sensing an air-fuel ratio of the exhaust gas is provided upstream of the catalyst 23.

A coolant temperature sensor 25 and a crank angle sensor 26 are attached to a cylinder block of the engine 11. The coolant temperature sensor 25 senses coolant temperature. The crank angle sensor 26 outputs a pulse signal each time a crankshaft of the engine 11 rotates by a predetermined crank angle. A crank angle and engine rotation speed are sensed based the output signal of the crank angle sensor 26.

Outputs of the above various sensors are inputted to an engine control circuit 27 (hereinafter, referred to as ECU). The ECU 27 is structured mainly by a microcomputer and executes various engine control programs stored in a ROM (a storage medium) incorporated therein. Thus, the ECU 27 performs state feedback to conform an air-fuel ratio of the exhaust gas sensed with the air-fuel ratio sensor 24 to a target air-fuel ratio and calculates an air-fuel ratio correction coefficient FAF (a feedback correction amount). Thus, the ECU 27 functions as an air-fuel ratio feedback control section for performing feedback control of a fuel quantity injected into the engine 11 (or an air-fuel ratio of a mixture gas).

The air-fuel ratio feedback system is designed by modeling a dynamic characteristic of a control object since the fuel quantity injected to the engine 11 is changed until the output of the air-fuel ratio sensor 24 changes using a dead time plus a first-order lag characteristic. The dynamic characteristic of the control object may be modeled with a dead time plus a second-order lag characteristic. The dynamic characteristic of the control object may be modeled with a dead time plus an n-th order lag characteristic (n is a positive integer).

Generally, a following expression is often used when calculating an air-fuel ratio correction coefficient FAF(i) based on control parameters F1 to Fd+1 and F0 of the state feedback.

$$FAF(i) = F1\cdot\lambda(i) + F2\cdot FAF(i-1) + F3\cdot FAF(i-2) + \ldots + Fd+1\cdot FAF(i-d) + F0\cdot\sum(\lambda ref - \lambda(i))$$

In the above expression, λ(i) is the present air-fuel ratio (an air excess ratio), FAF(i−1) to FAF(i-d) are the past air-fuel ratio correction coefficients and λref is a target air-fuel ratio (a target air excess ratio). d is a dead time expressed as an integer, which is made by truncating a part after a decimal point of a value calculated by dividing the sensed dead time L (sec) by a calculation interval (i.e., an injection interval dt).

If the control parameters F1 to Fd+1 and F0 are switched in accordance with an operation condition or the like in the above calculation method of the air-fuel ratio correction coefficient, there is a possibility that the air-fuel ratio correction coefficient FAF is temporarily disturbed at the moment and eventually the air-fuel ratio λ is temporarily disturbed.

Therefore, in the present embodiment, a present air-fuel ratio correction coefficient correction value ΔFAF(i) is calculated, and the calculated present air-fuel ratio correction coefficient correction value ΔFAF(i) is added to the previous air-fuel ratio correction coefficient FAF(i−1) to obtain the present air-fuel ratio correction coefficient FAF(i) as shown by a following expression.

$$FAF(i)=FAF(i-1)+\Delta FAF(i)$$

The present air-fuel ratio correction coefficient correction value ΔFAF(i) is calculated according to a following expression.

$$\begin{aligned}\Delta FAF(i) &= F1\cdot\Delta\varphi(i) + F2\cdot\Delta FAF(i-1) + \ldots + Fd+1\cdot\Delta FAF(i-d) + Fd+2\cdot\Delta FAF(i-d-1) + F0\cdot(\varphi ref-\varphi(i))\\ &= F1\cdot\Delta\varphi(i) + F2\cdot\{FAF(i-1)-FAF(i-2)\} + \ldots + Fd+2\cdot\{FAF(i-d-1)-FAF(i-d-2)\} + F0\cdot(\varphi ref-\varphi(i))\end{aligned}$$

In the expression, $\Delta\phi(i)$ is a change amount of a fuel excess ratio, that is, $\Delta\phi(i)=\phi(i)-\phi(i-1)$. $\Delta FAF(i-1)$ to $\Delta FAF(i-d-1)$ are the past air-fuel ratio correction coefficient correction values and $\phi ref$ is a target fuel excess ratio. In the above expression, the fuel excess ratio $\phi$ is used as substitute information of the air-fuel ratio. Alternatively, the air excess ratio $\lambda$ may be used.

When the air-fuel ratio correction coefficient FAF is calculated by using the above expression, even if the control parameters F1 to Fd+2 and F0 are switched in accordance with the operation condition or the like, the air-fuel ratio correction coefficient FAF is not disturbed, and the phenomenon that the air-fuel ratio is disturbed does not occur. In consequence, stable air-fuel ratio control can be performed while switching the control parameters F1 to Fd+2 and F0 in accordance with the operation condition or the like.

In order to meet the exhaust gas regulations (i.e., demand for lower emission), which will become more and more severe in the future, it has been increasingly required to reduce the deterioration of air-fuel ratio control accuracy due to degradation of the response characteristic of the control object (e.g., degradation of a dead time or degradation of a response time of the air-fuel ratio sensor 24).

Therefore, in the present embodiment, in consideration of the fact that the degradation of the response characteristic of the control object occurs asymmetrically between the rich side and the lean side, the dead time d in the case where the output of the air-fuel ratio sensor 24 changes from the rich side to the lean side and the dead time d in the case where the output of the air-fuel ratio sensor 24 changes from the lean side to the rich side are sensed respectively. The larger one of the two sensed dead times d is selected, and the number of elements constituting the data of the past air-fuel ratio correction coefficients FAF(i−1) to FAF(i-d−2) used for calculating the present air-fuel ratio correction coefficient FAF(i) is changed in accordance with the larger dead time d.

Moreover, in the present embodiment, a degradation degree of the dead time d is determined. When the degradation degree of the dead time d is equal to or less than a predetermined determination threshold value, the number of the elements constituting the data of the past air-fuel ratio correction coefficients FAF(i−1) to FAF(i-d−2) used for calculating the present air-fuel ratio correction coefficient FAF (i) is set to a value corresponding to an initial characteristic.

In the present embodiment, a response time in the case where the output of the air-fuel ratio sensor 24 changes from the rich side to the lean side is sensed as a lean direction response time and a response time in the case where the output of the air-fuel ratio sensor 24 changes from the lean side to the rich side is sensed as a rich direction response time respectively. A control gain (natural angular frequency $\omega$) is corrected in accordance with the lean direction response time when the output of the air-fuel ratio sensor 24 changes from the rich side to the lean side. The control gain (the natural angular frequency $\omega$) is corrected in accordance with the rich direction response time when the output of the air-fuel ratio sensor 24 changes from the lean side to the rich side.

Moreover, in the present embodiment, degradation degrees of the two response times ale determined respectively. When the degradation degree of the response time is equal to or less than a predetermined determination threshold value, the control gain (the natural angular frequency $\omega$) is set to a value corresponding to an initial characteristic.

Figure 2:
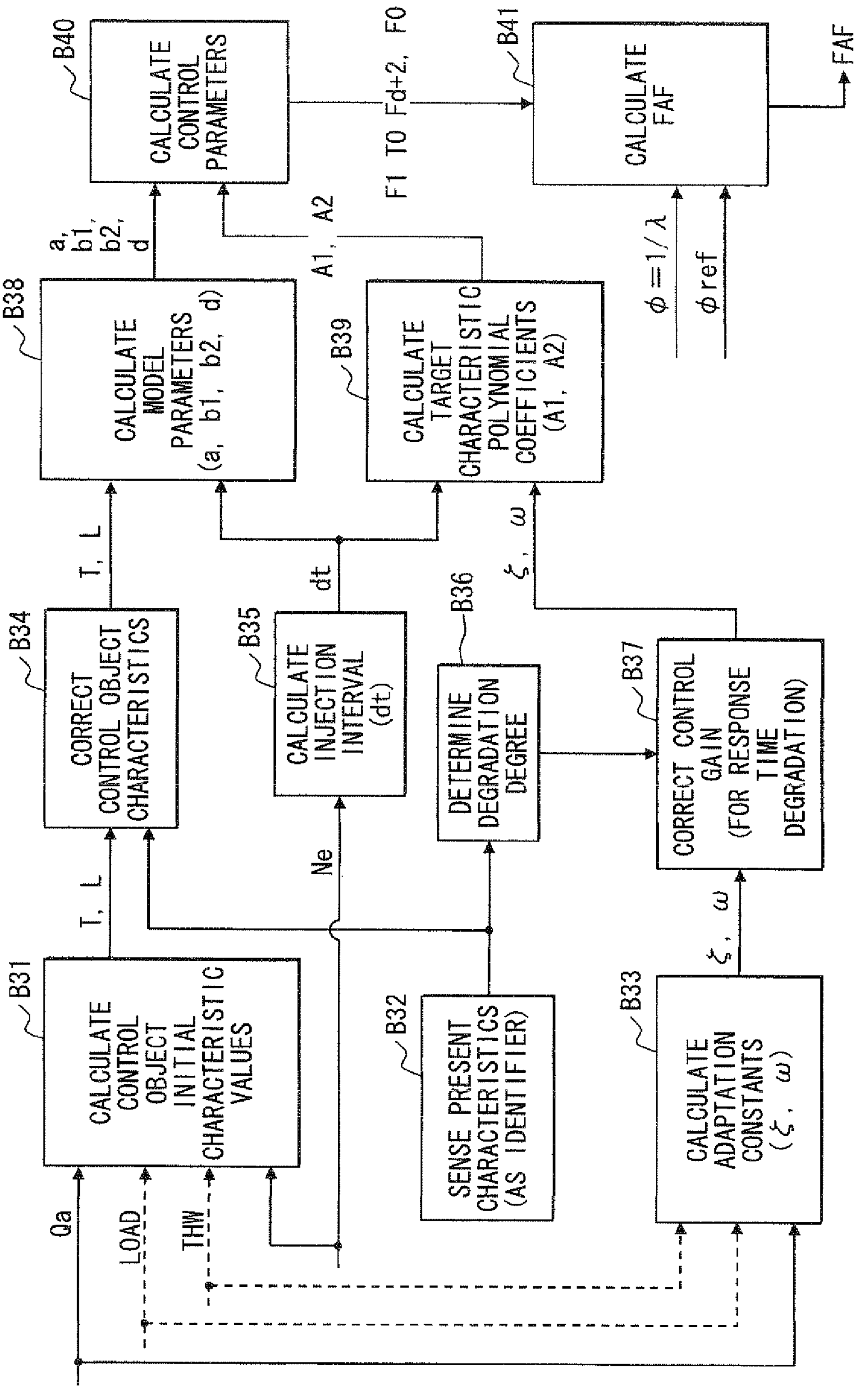
FIG. 2 is a functional block diagram showing functions of respective sections of an air-fuel ratio feedback control system according to the embodiment.

The above-described construction of the air-fuel ratio feedback control system according to the present embodiment is shown in a functional block diagram of FIG. 2. Each function of the air-fuel ratio feedback control system is realized by each of programs shown in FIGS. 3 to 13, which are executed by the ECU 27. Hereafter, processing contents of each program will be explained.

Figure 3:
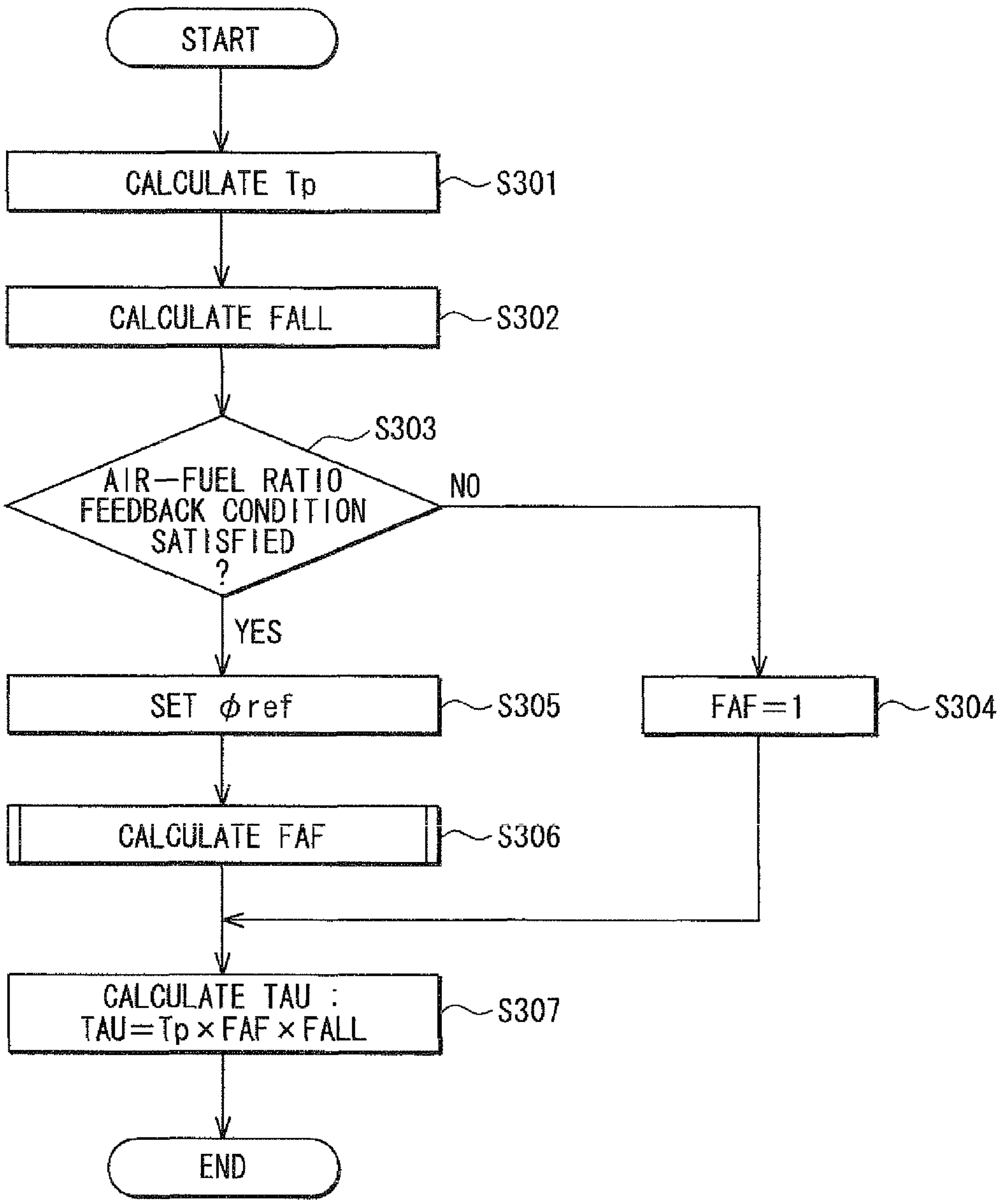
FIG. 3 is a flowchart showing a processing flow of a fuel injection quantity calculation program according to the embodiment.

A fuel injection quantity calculation program shown in FIG. 3 is started in synchronization with injection timing of each cylinder to calculate a fuel injection quantity TAU as follows. First in S301 (S means "Step"), a basic injection quantity Tp is calculated in accordance with the present engine operation condition with reference to a map or the like. Then, the process proceeds to S302, in which various correction coefficients FALL for the basic injection quantity Tp (e.g., a correction coefficient based on coolant temperature, a correction coefficient based on acceleration/deceleration and the like) are calculated. In following S303, it is determined whether an air-fuel ratio feedback condition is satisfied. When the air-fuel ratio feedback condition is not satisfied, the air-fuel ratio correction coefficient FAF is set at 1 (in S304) to control the air-fuel ratio by open loop control.

When the air-fuel ratio feedback condition is satisfied, the process proceeds to S305, in which the target fuel excess ratio $\phi ref$ is set so that the air-fuel ratio of the exhaust gas falls within a purification window of the catalyst 23 (i.e., a range around the theoretical air-fuel ratio). In following S306, a FAF calculation program shown in FIG. 10 (described in detail later) is executed to calculate the air-fuel ratio correction coefficient FAF.

Thus, the air-fuel ratio correction coefficient FAF is set in S304 or S306, and then, the process proceeds to S307. In S307, the fuel injection quantity TAU is calculated by multiplying the basic injection quantity Tp by the air-fuel ratio correction coefficient FAF and the various correction coefficients FALL. Thus, the air-fuel ratio of the exhaust gas is controlled within the purification window of the catalyst 23.

Figure 4:
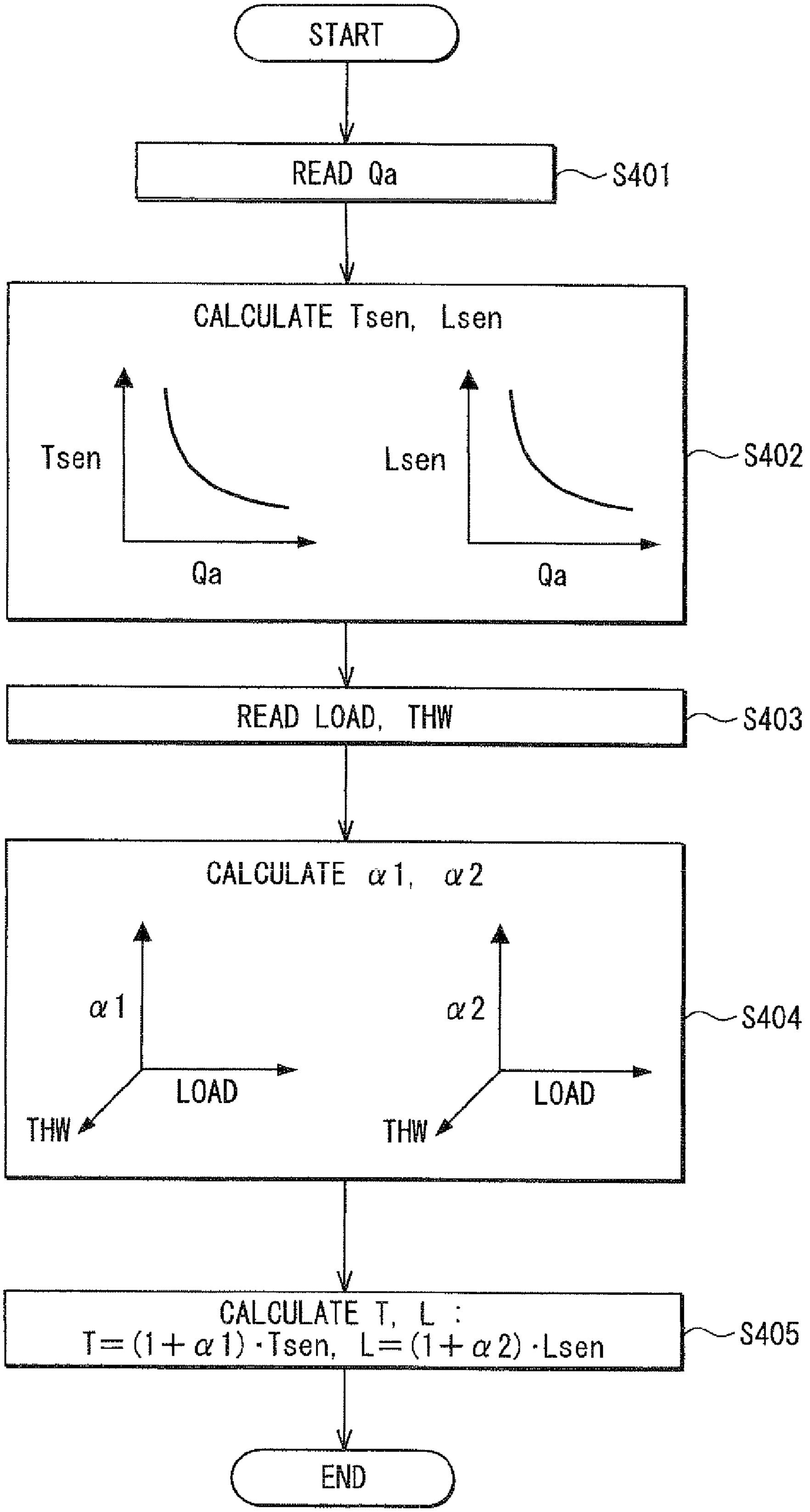
FIG. 4 is a flowchart showing a processing flow of a control object characteristic value calculation program according to the embodiment.

A control object initial characteristic value calculation program shown in FIG. 4 is started in synchronization with the injection timing of each cylinder to calculate a model time constant T and a dead time L of the control object as follows (thereby realizing a function of section B31 of FIG. 2).

When the program of FIG. 4 is started, first in S401, an intake air quantity Qa is read. In following S402, a basic model time constant Tsen and a basic dead time Lsen are respectively calculated with reference to maps, each of which uses the intake air quantity Qa as a parameter, or the like.

Then, the process proceeds to S403, in which a load (which is obtained by dividing the intake air quantity Qa by the engine rotation speed Ne) and the coolant temperature THW are read. Then, the process proceeds to S404, in which a time constant correction coefficient $\alpha$1 and a dead time correction coefficient $\alpha$2 are respectively calculated with reference to maps, each of which uses the load and the coolant temperature THW as parameters, or the like. In addition to the load and the coolant temperature THW, the engine rotation speed Ne or an elapse time after engine start may be included in the operation parameters used in the calculation maps of the correction coefficients $\alpha$1, $\alpha$2.

After the correction coefficients $\alpha$1, $\alpha$2 are calculated, the process proceeds to S405. In S405, the model time constant T and the dead time L of the control object are calculated by using the basic model time constant Tsens the basic dead time Lsen, and the respective correction coefficients $\alpha$1, $\alpha$2 according to following expressions. Thus, the program of FIG. 4 ends.

$$T=(1+\alpha 1)\cdot Tsen$$

$$T=(1+\alpha 2)\cdot Lsen$$

Figure 5:
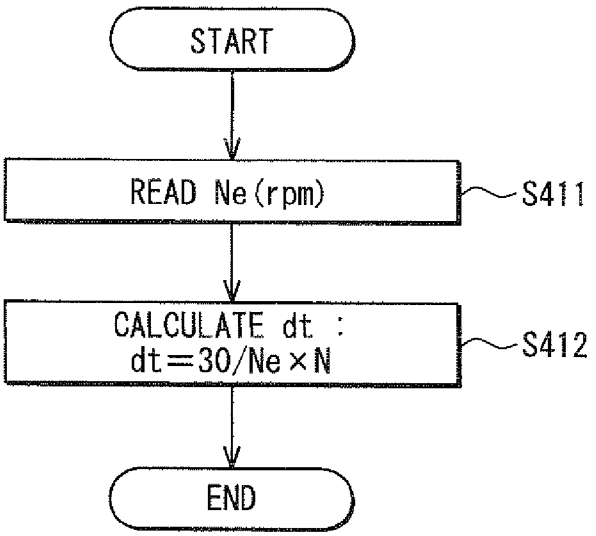
FIG. 5 is a flowchart showing a processing flow of an injection interval calculation program according to the embodiment.

An injection interval calculation program shown in FIG. 5 is started in synchronization with the injection timing of each cylinder to calculate an injection interval dt as follows (thereby realizing a function of section B35 of FIG. 2).

When the program of FIG. 5 is started, first in S411, the engine rotation speed Ne (rpm) is read. In following S412, the injection interval dt is calculated according to a following expression, in which N represents the number of the cylinders. Thus, the program of FIG. 5 ends.

$$dt=30/Ne\times N$$

Figure 6:
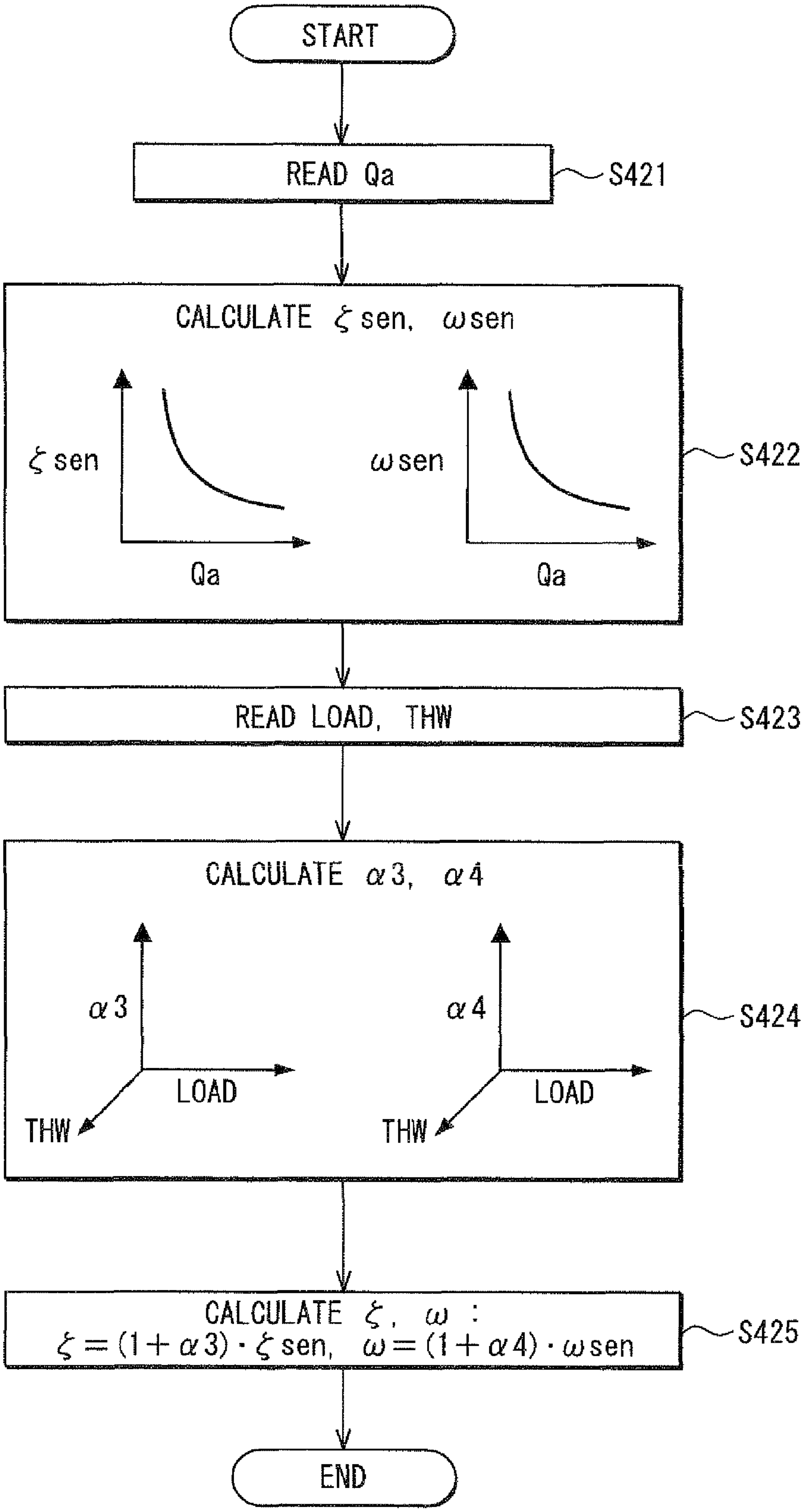
FIG. 6 is a flowchart showing a processing flow of a damping coefficient and natural angular frequency calculation program according to the embodiment.

A calculation program of a damping coefficient ζ and the natural angular frequency co shown in FIG. 6 is started in synchronization with the injection timing of each cylinder to calculate the damping coefficient ζ and the natural angular frequency ω used for calculation of a pole assignment method as follows (thereby realizing a function of section B33 of FIG. 2).

When the program of FIG. 6 is started, first in S421, the intake air quantity Qa is read. In following S422, a basic damping coefficient ζsen and a basic natural angular frequency ωsen are respectively calculated with reference to maps, each of which uses the intake air quantity Qa as a parameter.

Then, the process proceeds to S423, in which the load (which is obtained by dividing the intake air quantity Qa by the engine rotation speed Ne) and the coolant temperature THW are read. Then, the process proceeds to S424, in which a damping coefficient correction coefficient α3 and a natural angular frequency correction coefficient α4 are respectively calculated with reference to maps each using the load and the coolant temperature THW as parameters. In addition to the load and the coolant temperature THW, the engine rotation speed Ne or the elapse time after the engine start may be included in the operation parameters used in the calculation maps of the correction coefficients α3, α4.

After the correction coefficients α3, α4 are calculated, the process proceeds to S425. In S425, the damping coefficient ζ and the natural angular frequency ω are calculated by using the basic damping coefficient ζsen, the basic natural angular frequency ωsen, and the correction coefficients α3, α4 according to following expressions. Thus, the program of FIG. 6 ends.

$$\zeta=(1+\alpha 3)\cdot\zeta sen$$

$$\omega=(1+\alpha 4)\cdot\omega sen$$

In the present embodiment, the natural angular frequency ω (the control gain) is corrected in accordance with the response time as described later.

Figure 7:
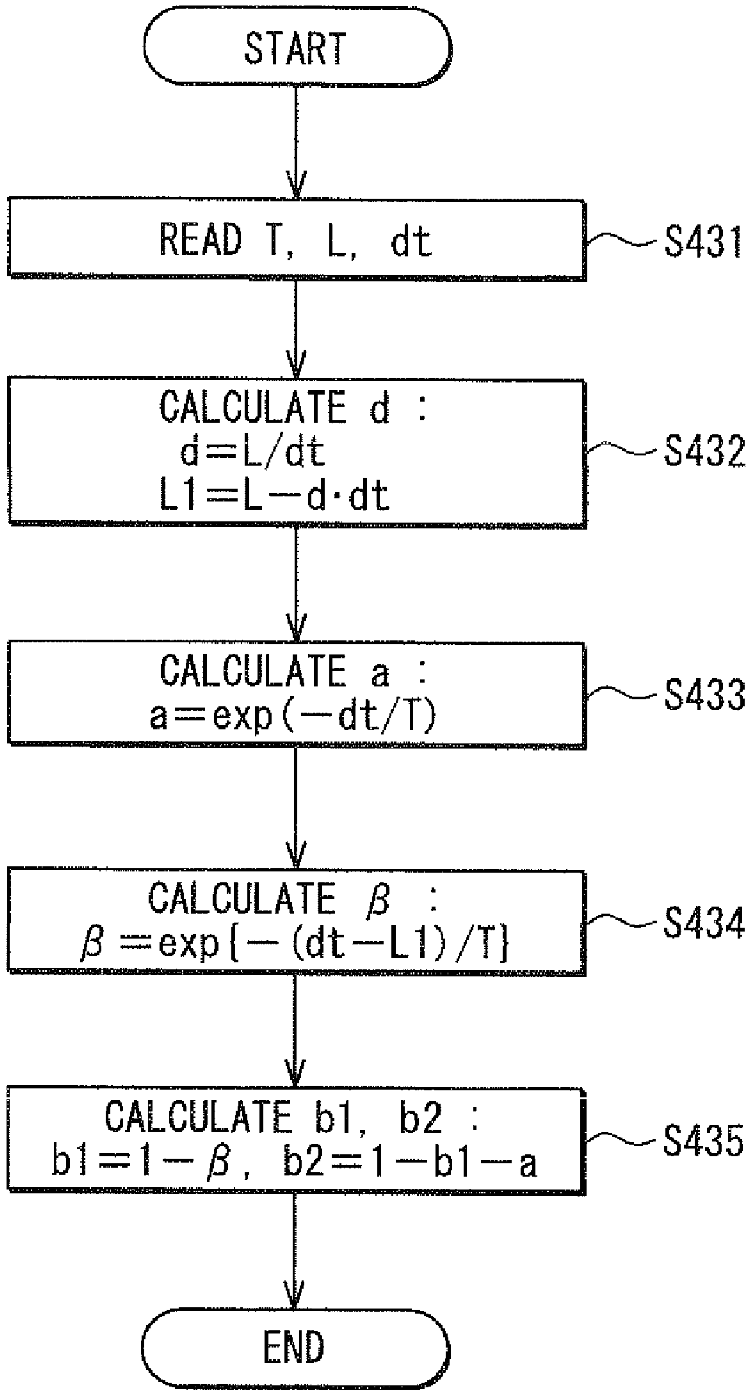
FIG. 7 is a flowchart showing a processing flow of a model parameter calculation program according to the embodiment.

A model parameter calculation program shown in FIG. 7 is started in synchronization with the injection timing of each cylinder to calculate model parameters a, b1, b2 as follows (thereby realizing a function of section B38 of FIG. 2).

When the program of FIG. 7 is started, first in S431, the model time constant T, the dead time L corrected with the present characteristic of the control object, and the injection interval dt are read. In following S432, the dead time d is calculated by truncating a portion after the decimal point of the dead time d (=L/dt) converted based on the injection interval dt (i.e., a calculation interval), and the truncated error L1 (=L−d·dt) is calculated.

Then, the process proceeds to S433, in which the model parameter a is calculated by using the model time constant T and the injection interval dt according to a following expression.

$$a=\exp(-dt/T)$$

This calculation requires a CPU with high performance. Therefore, it may be difficult to carry out the calculation of exp(−dt/T) at high speed with an arithmetic capacity of a CPU of a present in-vehicle computer. Therefore, in the present embodiment, for reducing the calculation load, for example, when a value of dt/T is equal to or less than 0.35, the value of exp(−dt/T) is approximated by a following expression, and the model parameter a is calculated according to the approximate expression.

$$a=1-dt/T+0.5(dt/T)^2$$

The above approximate expression causes a larger calculation error as the value of dt/T increases. Therefore, for example, in a range where the value of dt/T is larger than 0.35, a table (for example, a table shown below) defining a relationship between the value of dt/T and the model parameter a is beforehand stored in the ROM, and the model parameter a corresponding to the present value of dt/T is obtained by searching in the table. The model parameter a may be obtained with a preset table also when the value of dt/T is equal to or less than 0.35.

| dt/T | 0.350 | 0.400 | . . . | 5.000 | 6.000 |
|---|---|---|---|---|---|
| a | 0.711 | 0.670 | . . . | 0.007 | 0.000 |

Then, the process proceeds to S434, in which a variable β used for calculating the model parameters b1, b2 is calculated according to a following expression.

$$\beta=\exp\{-(dt-L1)/T\}$$

Also in the case where the variable β is calculated, for reducing the calculation load, for example, the value of exp {−(dt−L1)/T} is approximated by a following expression when the value of (dt−L1)/T is equal to or less than 0.35, and the variable β is calculated according to the approximate expression.

$$\beta=1-(dt-L1)/T+0.5\{(dt-L1)/T\}^2$$

The approximate expression causes a larger calculation error as the value of (dt−L1)/T increases. Therefore, for example, in a range where the value of (dt−L1)/T is larger than 0.35, a table (for example, a table shown below) defining a relationship between the value of (dt−L1)/T and the variable β is beforehand stored in the ROM, and the variable β corresponding to the present value of (dt−L1)/T is obtained by searching in the table. The variable β may be obtained by a preset table also when the value of (dt−L1)/T is equal to or less than 0.35.

| (dt − L1)/T | 0.350 | 0.400 | . . . | 5.000 | 6.000 |
|---|---|---|---|---|---|
| β | 0.711 | 0.670 | . . . | 0.007 | 0.000 |

Then, the process proceeds to S435, in which the model parameters b1, b2 are calculated by using the variable β and the model parameter a according to following expressions.

$$b1=1-\beta$$

$$b2=1-b1-a$$

Figure 8:
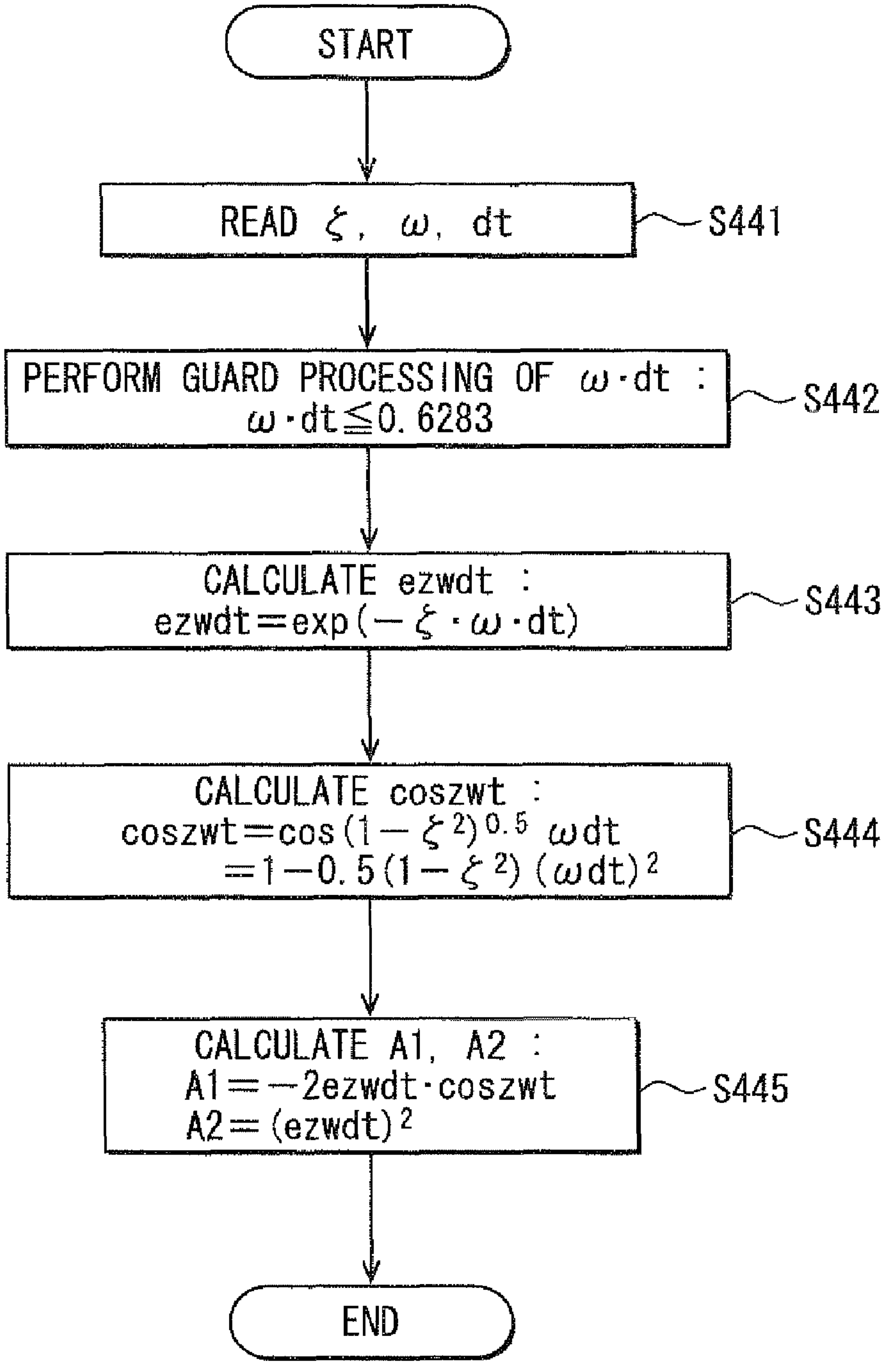
FIG. 8 is a flowchart showing a processing flow of a characteristic polynomial coefficient calculation program according to the embodiment.

A characteristic polynomial coefficient calculation program shown in FIG. 8 is started in synchronization with the injection timing of each cylinder to calculate coefficients A1, A2 of a characteristic polynomial as follows by a pole assignment method that sets roots, the number of which corresponds to the dead time d of the control model, at zero (thereby realizing a function of section B39 of FIG. 2). Details of the pole assignment method are described in the specification of Japanese patent application No. 2000-189734 (equivalent to U.S. Pat. No. 6,591,822) filed by the applicant of the present invention.

When the program of FIG. 8 is started, first in S441, the damping coefficient ζ, the natural angular frequency ω corrected in accordance with the response time, and the injection interval dt are read. In following S442, guard-processing of the value of ω·dt is performed with an upper limit guard value (for example, 0.6283). That is, the value of ω·dt is set to the upper limit guard value when the value of ω·dt is larger than the upper limit guard value. The value of ω·dt is used as it is when the value of ω·dt is equal to or less than the upper limit guard value. The guard-processing of the value of ω·dt is performed with the upper limit guard value because the control accuracy is deteriorated if the value of ω·dt becomes excessively large.

After the guard-processing of the value of ω·dt, the process proceeds to S443, in which a variable ezwdt used for calculating the coefficients A1, A2 of the characteristic polynomial is calculated according to a following expression.

$$ezwdt=\exp(-\zeta\cdot\omega\cdot dt)$$

In order to reduce the calculation load of the ECU 27 also when the variable ezwdt is calculated, for example, the value of exp(−ζ·ω·dt) is approximated by a following expression when the value of ζ·ω·dt is equal to or less than 0.35, and the variable ezwdt is calculated according to the approximate expression.

$$ezwdt=1-\zeta\cdot\omega\cdot dt+0.5(\zeta\cdot\omega\cdot dt)^2$$

The approximate expression causes the larger calculation error as the value of ζ·ω·dt increases. Therefore, for example, in a range where the value of ζ·ω·dt is greater than 0.35, a table (for example, a table shown below) defining a relationship between the value of ζ·ω·dt and the variable ezwdt is beforehand stored in the ROM and the variable ezwdt corresponding to the present value of ζ·ω·dt is obtained by searching in the table. The variable ezwdt may be obtained by a preset table also when the value of ζ·ω·dt is equal to or less than 0.35.

| ζ · ω · dt | 0.350 | 0.400 | . . . | 5.000 | 6.000 |
|---|---|---|---|---|---|
| ezwdt | 0.711 | 0.670 | . . . | 0.007 | 0.000 |

Then, the process proceeds to S444, in which another variable cos zwt used for calculating the coefficients A1, A2 of the characteristic polynomial is calculated according to a following expression.

$$\cos zwt=\cos\{(1-\zeta^2)^{0.5}\cdot\omega\cdot dt\}$$

Also when the variable cos zwt is calculated, a following approximate expression is used for reducing the calculation load of the CPU.

$$\cos zwt=1-0.5(1-\zeta^2)(\omega\cdot dt)^2$$

Then, the process proceeds to S445, in which the coefficients A1, A2 of the characteristic polynomial are calculated by using the variables ezwdt, cos zwt according to following expressions.

$$A1=-2\cdot ezwdt\cdot\cos zwt$$

$$A2=(ezwdt)^2$$

Figure 9:
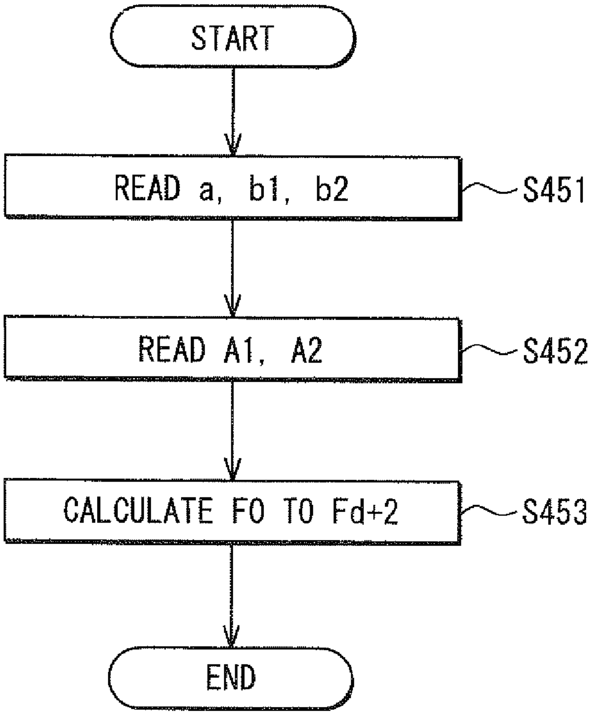
FIG. 9 is a flowchart showing a processing flow of a control parameter calculation program according to the embodiment.

A control parameter calculation program shown in FIG. 9 is started in synchronization with the injection timing of each cylinder to calculate the control parameters F0 to Fd+2 of the state feedback as follows (thereby realizing a function of section B40 of FIG. 2).

When the program of FIG. 9 is started, first in S451 the model parameters a, b1, b2 of the control model are read. In following S452, the coefficients A1, A2 of the characteristic polynomial are read.

Then, the process proceeds to S453, in which the control parameters F0 to Fd+2 are calculated by using the model parameters a, b1, b2 and the coefficients A1, A2. In this case, the number of the control parameters F0 to Fd+2 is set by a control parameter number calculation program shown in FIG. 12 described later.

For example, in the case where d=6, the control parameters F0 to F8 are calculated according to following expressions.

$$F0=(1+A1+A2)/(b1+b2)$$

$$F2=-1-a-A1$$

$$F3=a-A2+(1+a)\cdot F2$$

$$F4=(1+a)\cdot F3-a\cdot F2$$

$$F5=(1+a)\cdot F4-a\cdot F3$$

$$F6=(1+a)\cdot F5-a\cdot F4$$

$$F7=(1+a)\cdot F6-a\cdot F5$$

$$F1=a/(a\cdot b1+b2)\cdot(a\cdot F7-b1\cdot F0)$$

$$F8=b2/a\cdot F1$$

Figure 10:
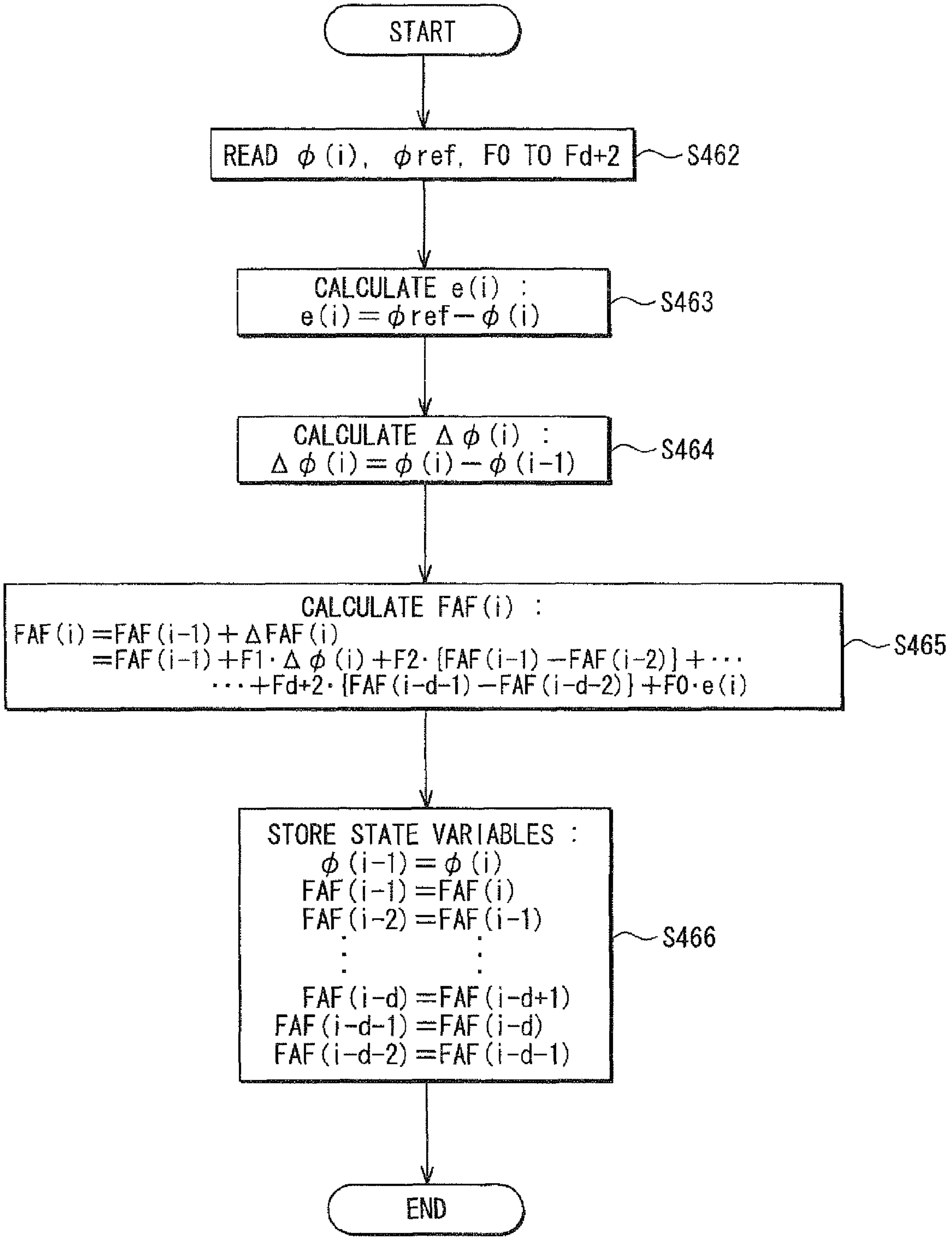
FIG. 10 is a flowchart showing a processing flow of a FAF calculation program according to the embodiment.

A FAF calculation program shown in FIG. 10 is started in S306 of the fuel injection quantity calculation program of FIG. 3 described above to calculate the air-fuel ratio correction coefficient FAF as follows (thereby realizing a function of section B41 of FIG. 2).

When the program of FIG. 10 is started, first in S462, the present fuel excess ratio φ(i), the target fuel excess ratio φref and the control parameters F0 to Fd+2 are read. In this case, the number of the control parameters F0 to Fd+2 is set by the control parameter number calculation program shown in FIG. 12 described later.

Then, the process proceeds to S463, in which a deviation e(i) of the actual fuel excess ratio φ(i) from the target fuel excess ratio φref is calculated as follows.

$$e(i)=\phi ref-\phi(i)$$

Then, the process proceeds to S464, in which a change amount Δφ(i) from the previous fuel excess ratio φ(i−1) to the present fuel excess ratio φ(i) is calculated as follows.

$$\Delta\phi(i)=\phi(i)-\phi(i-1)$$

Then, the process proceeds to S465, in which the present air-fuel ratio correction coefficient correction value ΔFAF(i) is added to the previous air-fuel ratio correction coefficient FAF(i−1) to calculate the present air-fuel ratio correction coefficient FAF(i).

$$\begin{aligned}FAF(i) &= FAF(i-1)+\Delta FAF(i)\\ &= FAF(i-1)+F1\cdot\Delta\varphi(i)+F2\cdot\\ &\quad\{FAF(i-1)-FAF(i-2)\}+\ldots+Fd+2\cdot\\ &\quad\{FAF(i-d-1)-FAF(i-d-2)\}+F0\cdot e(i)\end{aligned}$$

Then, the process proceeds to S466, in which memory data of ϕ(i−1) and FAF(i−1) to FAF(i-d−2) are updated to prepare for the next calculation of the air-fuel ratio correction coefficient FAF.

$$\varphi(i-1)=\varphi(i)$$

$$FAF(i-1)=FAF(i)$$

$$FAF(i-2)=FAF(i-1)$$

$$\ldots$$

$$\ldots$$

$$FAF(i-d)=FAF(i-d+1)$$

$$FAF(i-d-1)=FAF(i-d)$$

$$FAF(i-d-2)=FAF(i-d-1)$$

The present air-fuel ratio correction coefficient correction value ΔFAF(i) may be calculated by a following expression, and then, the present air-fuel ratio correction coefficient correction value ΔFAF(i) may be added to the previous air-fuel ratio correction coefficient FAF(i−1) to obtain the present air-fuel ratio correction coefficient FAF(i).

$$\Delta FAF(i)=F1\cdot\Delta\varphi(i)+F2\cdot\Delta FAF(i-1)+\ldots+Fd+1\cdot\Delta FAF(i-d)+Fd+2\cdot\Delta FAF(i-d-1)+F0\cdot(\varphi ref-\varphi(i))$$

In this case, the memory data of ΔFAF(i−1) to FAF(i-d−1) may be updated to prepare for the next calculation of the air-fuel ratio correction coefficient FAF and the air-fuel ratio correction coefficient correction value ΔFAF.

Figure 11:
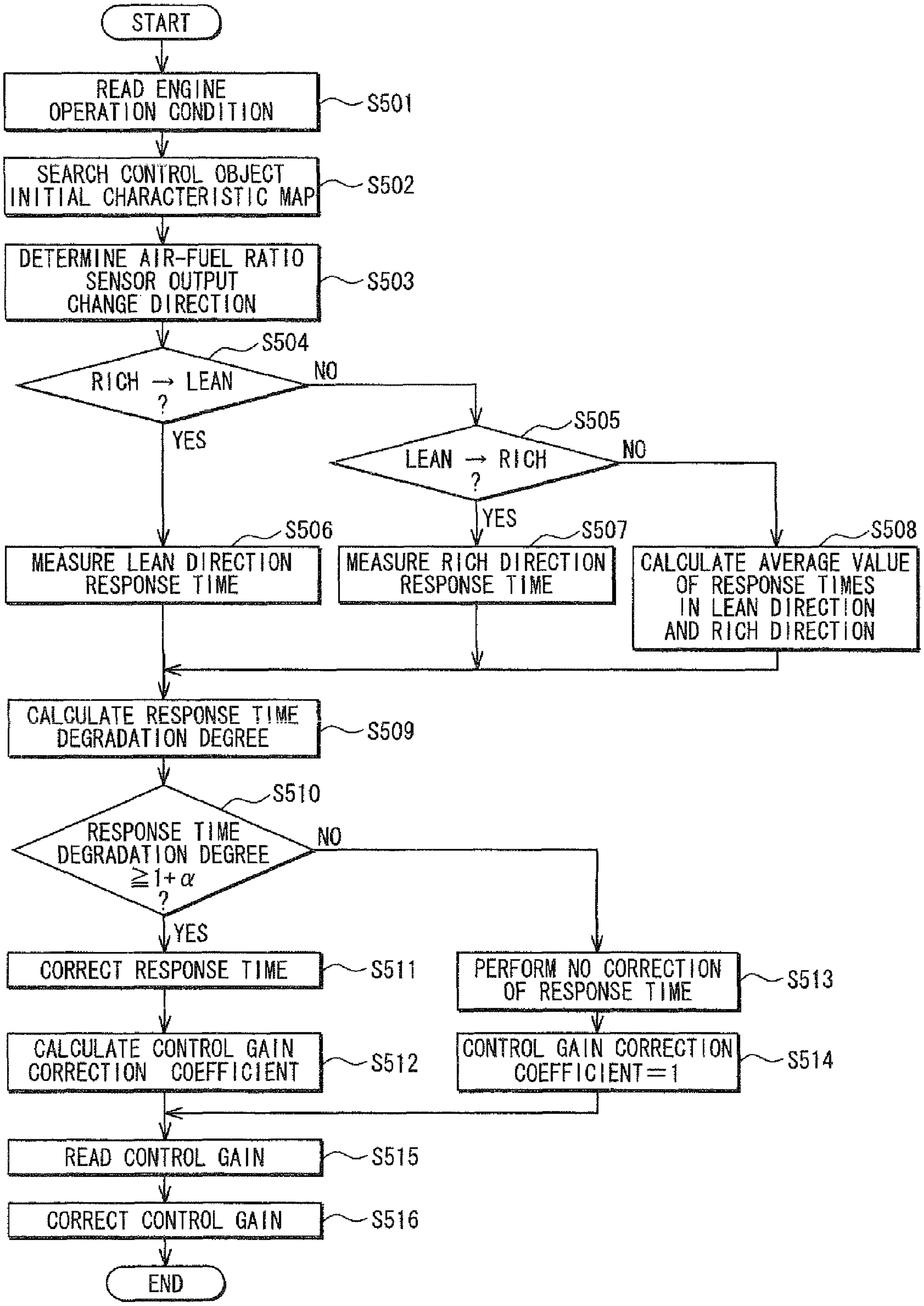
FIG. 11 is a flowchart showing a processing flow of a control gain calculation program according to the embodiment.

A control gain calculation program shown in FIG. 11 is started in synchronization with the injection timing of each cylinder and serves as a control gain correcting section for correcting the control gain (the natural angular frequency ω) in accordance with the response time of the air-fuel ratio sensor 24.

Figure 15:
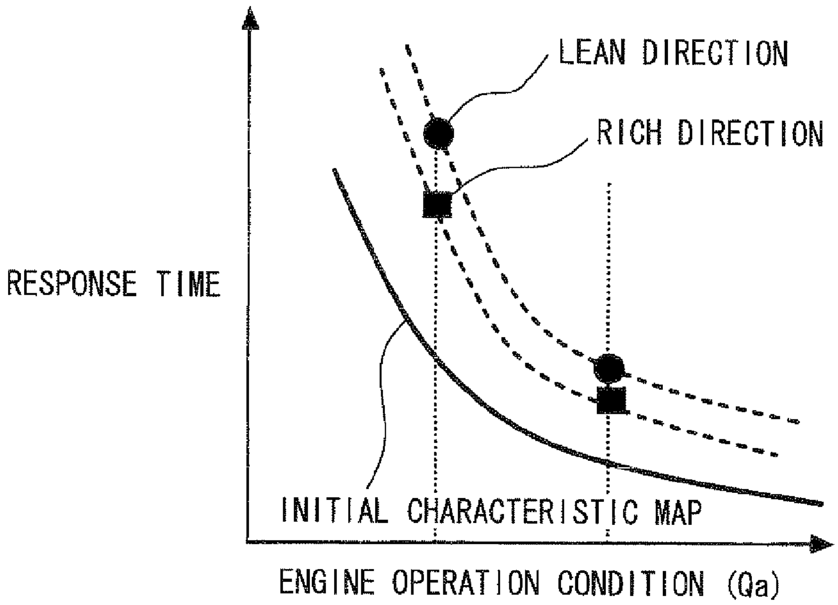
FIG. 15 is a diagram showing an example of a relationship between a response time of a control object and an engine operation condition according to the embodiment.

When the program of FIG. 11 is started, first in S501, the present engine operation condition (e.g., the intake air quantity Qa, the engine rotation speed Ne and the like) is read. In following S502, a control object initial characteristic map (refer to FIG. 15) is searched to calculate the response time in the initial characteristic of the control object corresponding to the present engine operation condition (the intake air quantity Qa, the engine rotation speed Ne and the like).

Figure 14:
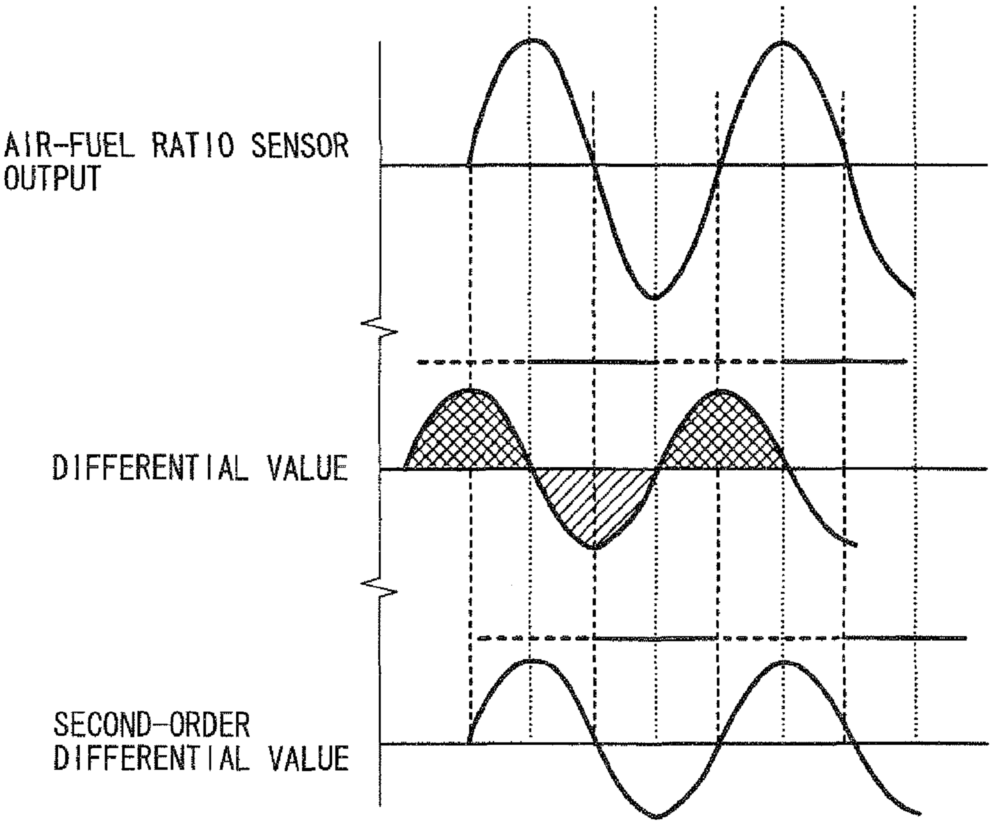
FIG. 14 is a time chart for explaining a determination method of a change direction of an output (an air-fuel ratio) of an air-fuel ratio sensor according to the embodiment.

Then, the process proceeds to S503, in which the change direction of the output of the air-fuel ratio sensor 24 is determined. The change direction of the output of the air-fuel ratio sensor 24 between the rich side and the lean side may be determined based on whether a difference value between the present output and the previous output of the air-fuel ratio sensor 24 is positive or negative. Alternatively, as shown in FIG. 14, the change direction of the output of the air-fuel ratio sensor 24 between the rich side and the lean side may be determined based on whether a differential value or a second-order differential value of the output of the air-fuel ratio sensor 24 is positive or negative.

Thereafter, the process proceeds to S504 in which it is determined whether the change direction of the output of the air-fuel ratio sensor 24 is a direction from the rich side to the lean side based on the determination result of S503. When the change direction is the direction from the rich side to the lean side, the process proceeds to S506. In S506, the response time in the direction in which the present control object changes from the rich side to the lean side (referred to as a lean direction response time) is measured or sequentially identified. In the case where the lean direction response time is measured, the method described in JP-A-2007-187129, JP-A-2007-9713 or JP-A-2007-9708 may be used, for example.

When it is determined that the change direction of the output of the air-fuel ratio sensor 24 is not the direction from the rich side to the lean side in S504, the process proceeds to S505. In S505, it is determined whether the change direction of the output of the air-fuel ratio sensor 24 is a direction from the lean side to the rich side. When the change direction is the direction from the lean side to the rich side, the process proceeds to S507. In S507, the response time in the direction in which the present control object changes from the lean side to the rich side (referred to as a rich direction response time) is measured or sequentially identified. In the case where the rich direction response time is measured, the method described in JP-A-2007-187129, JP-A-2007-9713 or JP-A-2007-9708 may be used, for example.

When negative results are made by the determination in both of S504 and S505, the process proceeds to S508, in which an average value of the lean direction response time and the rich direction response time is calculated. The processing of S503 to S508 functions as a response time sensing section (section B32 of FIG. 2).

Figure 17:
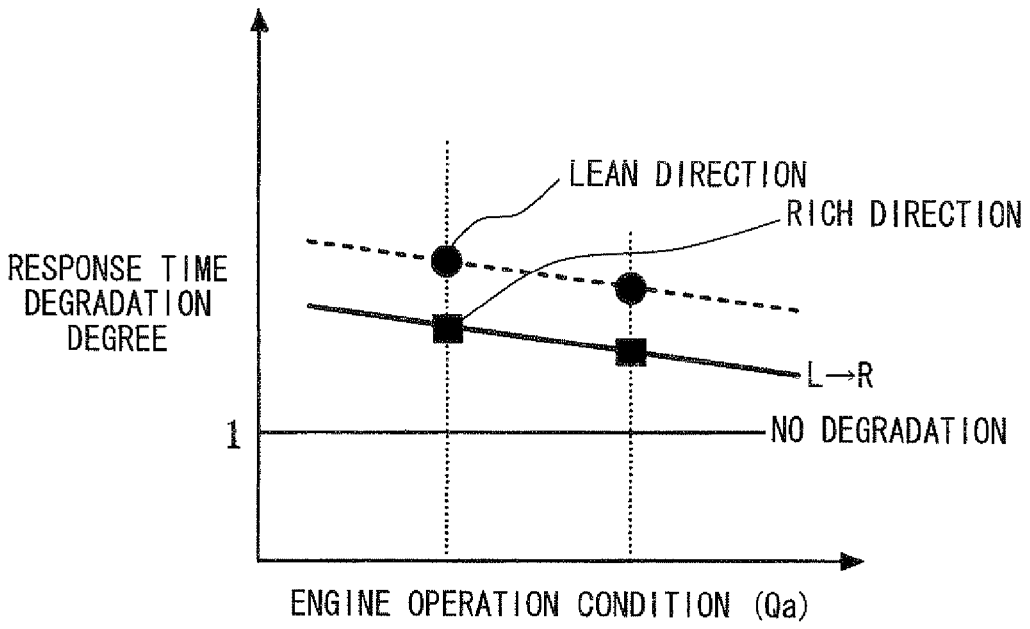
FIG. 17 is a diagram showing an example of a relationship between asymmetrical degradation of the response time of the air-fuel ratio sensor between a rich side and a lean side and the engine operation condition according to the embodiment.

Then, the process proceeds to S509, in which a ratio of the response time of the present characteristic of the control object to the response time of the initial characteristic of the control object is calculated under the same operation condition. The ratio is obtained as a response time degradation degree (refer to FIG. 17). The processing of S509 functions as a response time degradation degree determining section (section B36 of FIG. 2).

Figure 19:
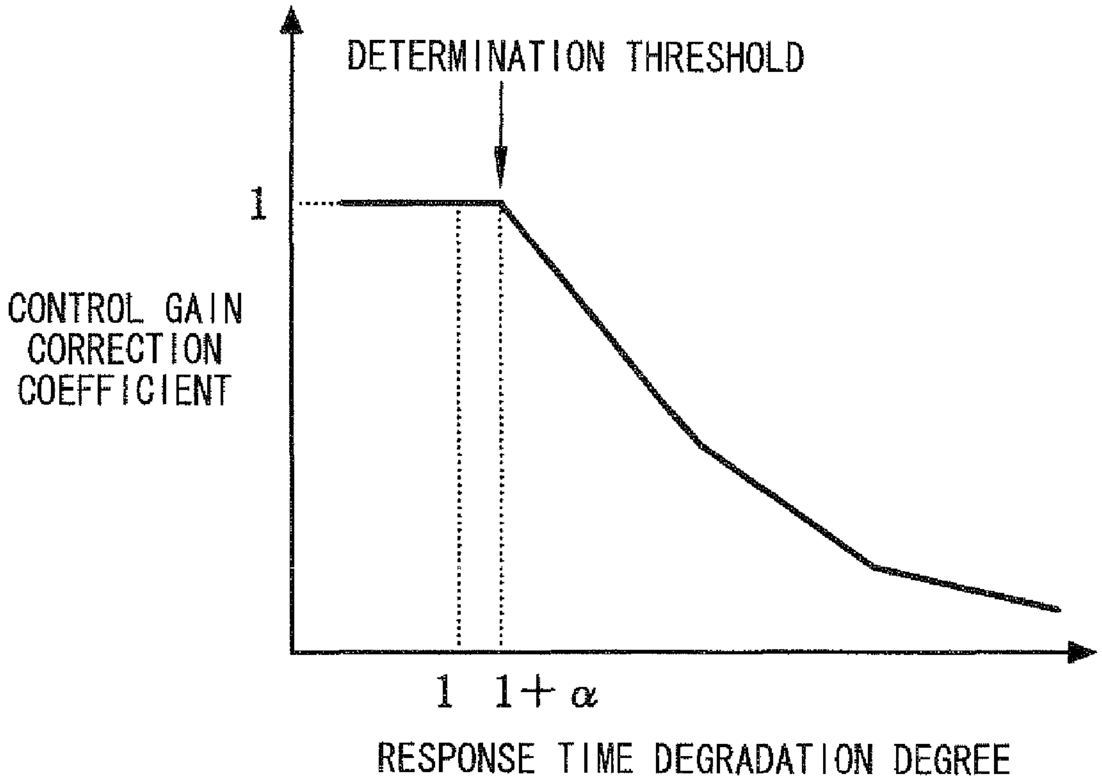
FIG. 19 is a diagram showing a control gain correction coefficient map according to the embodiment.

In following S510, the response time degradation degree is compared with a predetermined determination threshold value (1+α). When the response time degradation degree is equal to or greater than the predetermined determination threshold value (1+α), it is determined that the response time is degraded and the process proceeds to S511. In S511 the response time is corrected in accordance with the response time degradation degree. In following S512, a control gain correction coefficient map shown in FIG. 19 is searched to calculate a control gain correction coefficient corresponding to the present response time degradation degree. The control gain correction coefficient map shown in FIG. 19 is set such that the control gain correction coefficient gradually decreases from 1 (indicating no correction) as the response time degradation degree increases.

When it is determined in S510 that the response time degradation degree is smaller than the predetermined determination threshold value (1+α), it is determined that the response time is not degraded, and the correction of the response time is not performed (in S513). Then, the control gain correction coefficient is set to 1 (in S514).

After the control gain correction coefficient is calculated, the process proceeds to S515, in which the control gain (the natural angular frequency ω) of the initial characteristic calculated by the calculation program of the damping coefficient ζ and the natural angular frequency ω shown in FIG. 6 is read. In following S516, the control gain of the initial characteristic is corrected by multiplying the control gain of the initial characteristic by the control gain correction coefficient. Thus, the control gain of the present characteristic is obtained. The processing of S510 to S516 described above corresponds to section B37 of FIG. 2.

Figure 12:
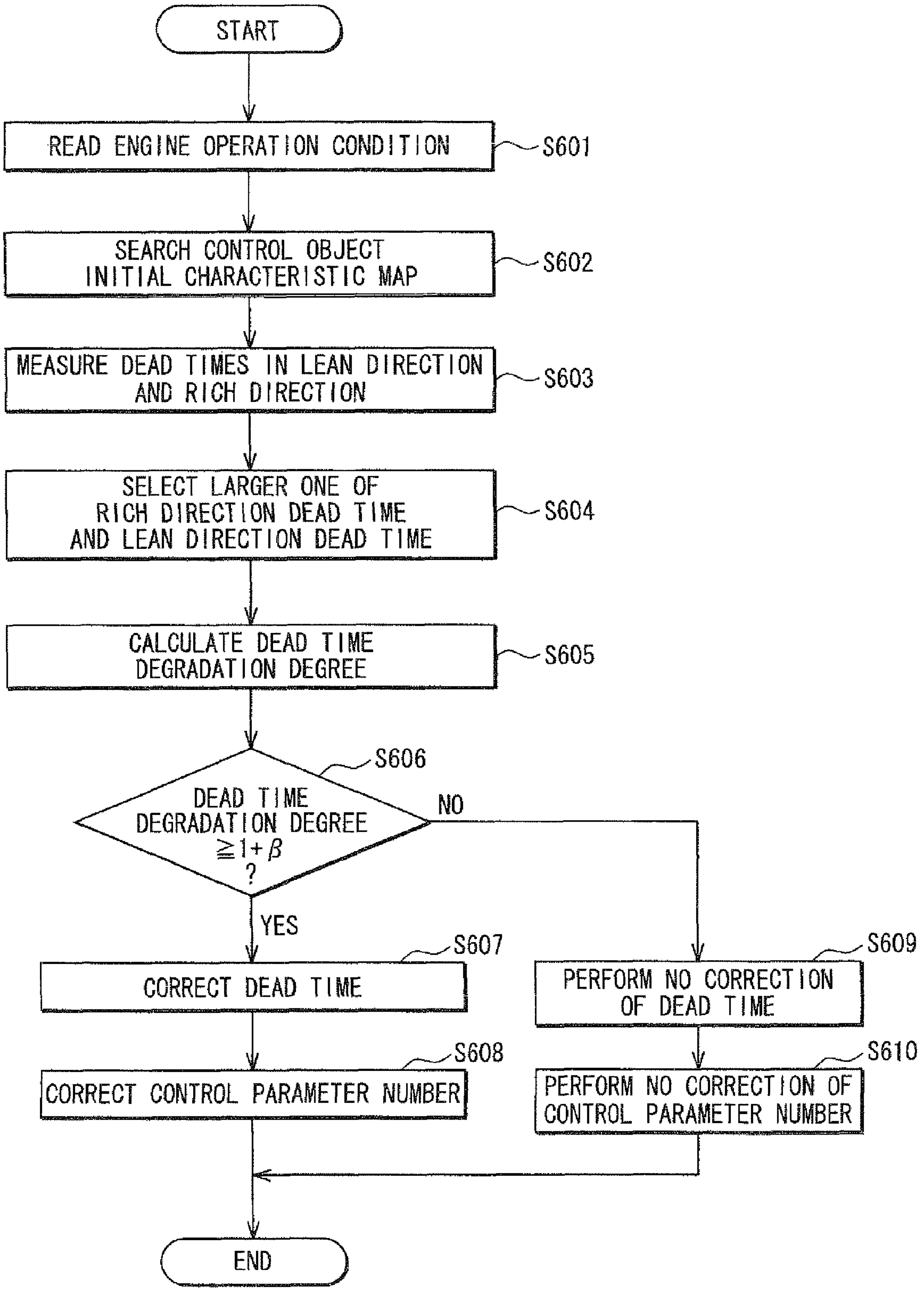
FIG. 12 is a flowchart showing a processing flow of a control parameter number calculation program according to the embodiment.

The control parameter number calculation program of FIG. 12 is started in synchronization with the injection timing of each cylinder to change the number of the control parameters F1 to Fd+2 and F0 (the number of elements constituting the data of the past air-fuel ratio correction coefficients FAF(i−1) to FAF(i-d−2)) in accordance with the dead time as follows.

Figure 16:
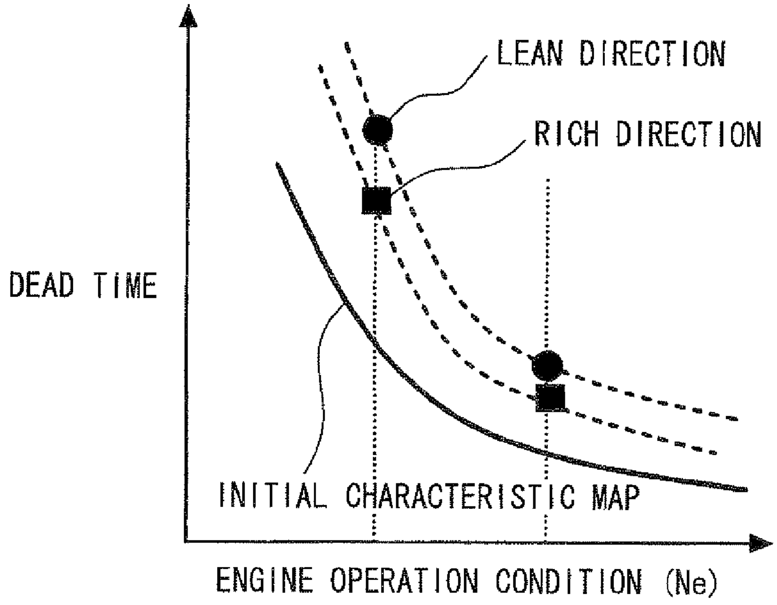
FIG. 16 is a diagram showing an example of a relationship between a dead time of the control object and an engine operation condition according to the embodiment.

When the program of FIG. 12 is started, first in S601, the present engine operation condition (the intake air quantity Qa, the engine rotation speed Ne and the like) is read. In following S602, a control object initial characteristic map (refer to FIG. 16) is searched to calculate the dead time in the initial characteristic of the control object corresponding to the present engine operation condition (the intake air quantity Qa, the engine rotation speed Ne and the like).

Then, the process proceeds to S603, in which the dead time in the case where the output of the air-fuel ratio sensor 24 changes from the rich side to the lean side (referred to as a lean direction dead time) and the dead time in the case where the output of the air-fuel ratio sensor 24 changes from the lean side to the rich side (referred to as a rich direction dead time) are measured or sequentially identified. In the case where the dead time in the lean direction and the dead time in the rich direction are measured, the method described in JP-A-2007-187129, JP-A-2007-9713 or JP-A-2007-9708 may be used, for example. The processing of S603 functions as a dead time sensing section (section B32 of FIG. 2)

Figure 18:
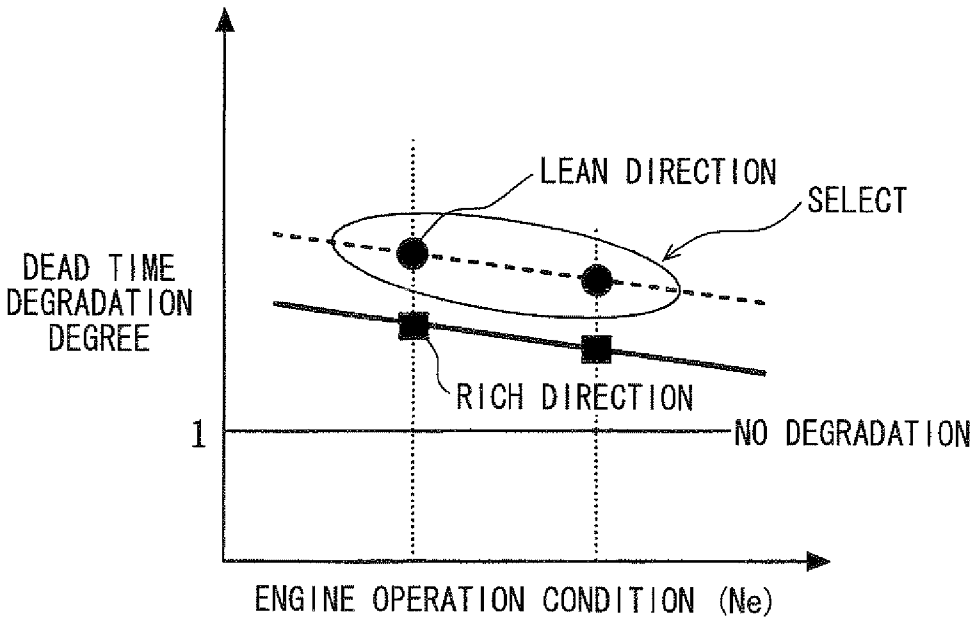
FIG. 18 is a diagram showing an example of a relationship between asymmetrical degradation of the dead time of the control object between the rich side and the lean side and the engine operation condition according to the embodiment.

Then, the process proceeds to S604, in which the larger one of the lean direction dead time and the rich direction dead time is selected (refer to FIG. 18). Then, the process proceeds to S605, in which a ratio of the dead time of the present characteristic of the control object to the dead time of the initial characteristic of the control object is calculated under the same operation condition. The ratio is obtained as a dead time degradation degree. The processing of S605 functions as a dead time degradation degree determining section.

Then, the process proceeds to S606, in which the dead time degradation degree is compared with a predetermined determination threshold value (1+β). When the dead time degradation degree is equal to or greater than the predetermined determination threshold value (1+β), it is determined that the dead time is degraded and the process proceeds to S607. In S607, the dead time is corrected in accordance with the dead time degradation degree. In this case, the dead time of the initial characteristic may be corrected by multiplying the dead time of the initial characteristic by the dead time degradation degree, thereby obtaining the dead time of the present characteristic. In following S608, the number of the control parameters F1 to Fd+2 and F0 (i.e., the number of the elements constituting the data of the past air-fuel ratio correction coefficients FAF(i−1) to FAF(i-d−2)) is corrected in accordance with the dead time after the correction.

When it is determined in S606 that the dead time degradation degree is smaller than the predetermined determination threshold value (1+β), it is determined that the dead time is not degraded and the correction of the dead time is not performed (in S609). The number of the control parameters F1 to Fd+2 and F0 (the number of the elements constituting the data of the past air-fuel ratio correction coefficients FAF(i−1) to FAF(i-d−2)) is not corrected (in S610).

Figure 13:
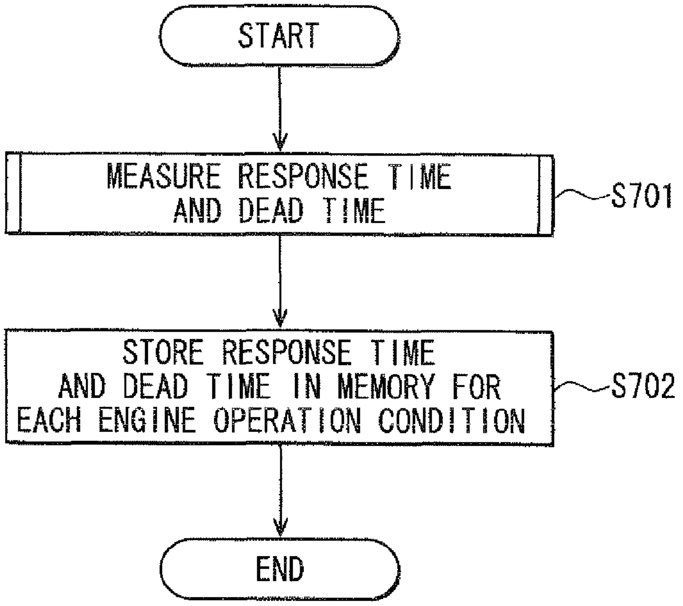
FIG. 13 is a flowchart showing a processing flow of a control object characteristic change storage program according to the embodiment.

A control object characteristic change storage program shown in FIG. 13 is started in synchronization with the injection timing of each cylinder. First, in S701, the response time and the dead time in the present characteristic of the control object are measured or sequentially identified. In S701, the method described in JP-A-2007-187129, JP-A-2007-9713 or JP-A-2007-9708 may be used. Then, the process proceeds to S702, in which the response time and the dead time are stored in a memory (not shown) for each engine operation condition (the intake air quantity Qa, the engine rotation speed Ne and the like), and the program of FIG. 13 ends.

Figure 20:
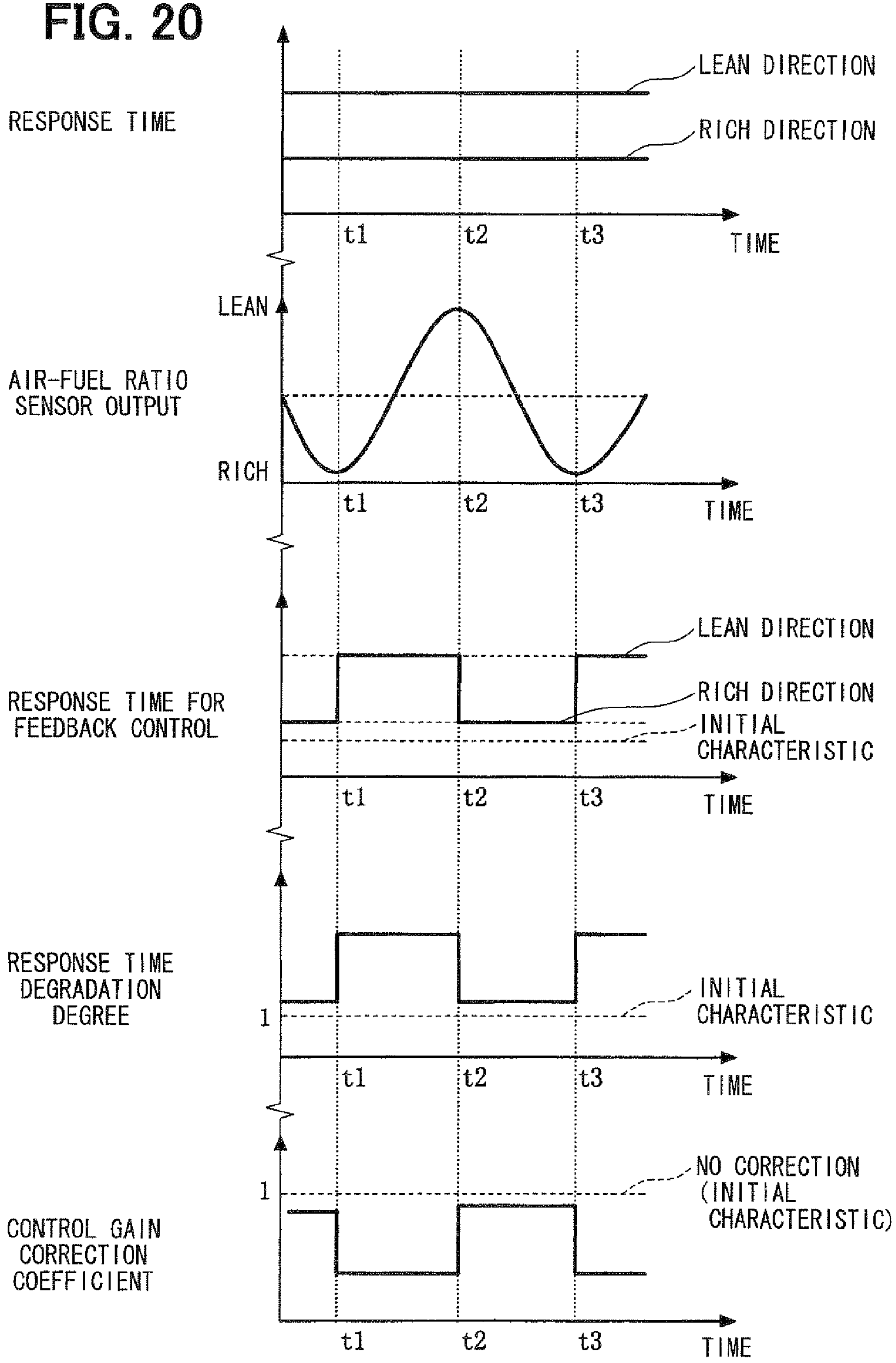
FIG. 20 is a diagram showing an example of a behavior of a control gain correction coefficient according to the embodiment.

FIG. 20 is a time chart showing an example of a behavior of the control gain correction coefficient in the case where the control gain correction coefficient is changed in accordance with the response time degradation. In the example of FIG. 20, the change direction of the output of the air-fuel ratio sensor 24 is a direction from the rich side to the lean side during a period from time t1 to time t2. Therefore, the lean direction response time is selected in the period t1 to t2 as the response time used for the feedback control. In contrast, the change direction of the output of the air-fuel ratio sensor 24 is a direction from the lean side to the rich side during a period from time t2 to time t3. Therefore, the rich direction response time is selected in the period t2 to t3 as the response time used for the feedback control. In the example of FIG. 20, the lean direction response time is larger than the rich direction response time. Therefore, the response time degradation degree is large during the period (t1 to t2) where the lean direction response time is selected. As a result, the control gain correction coefficient is small, so the control gain is corrected to be small.

Figure 21:
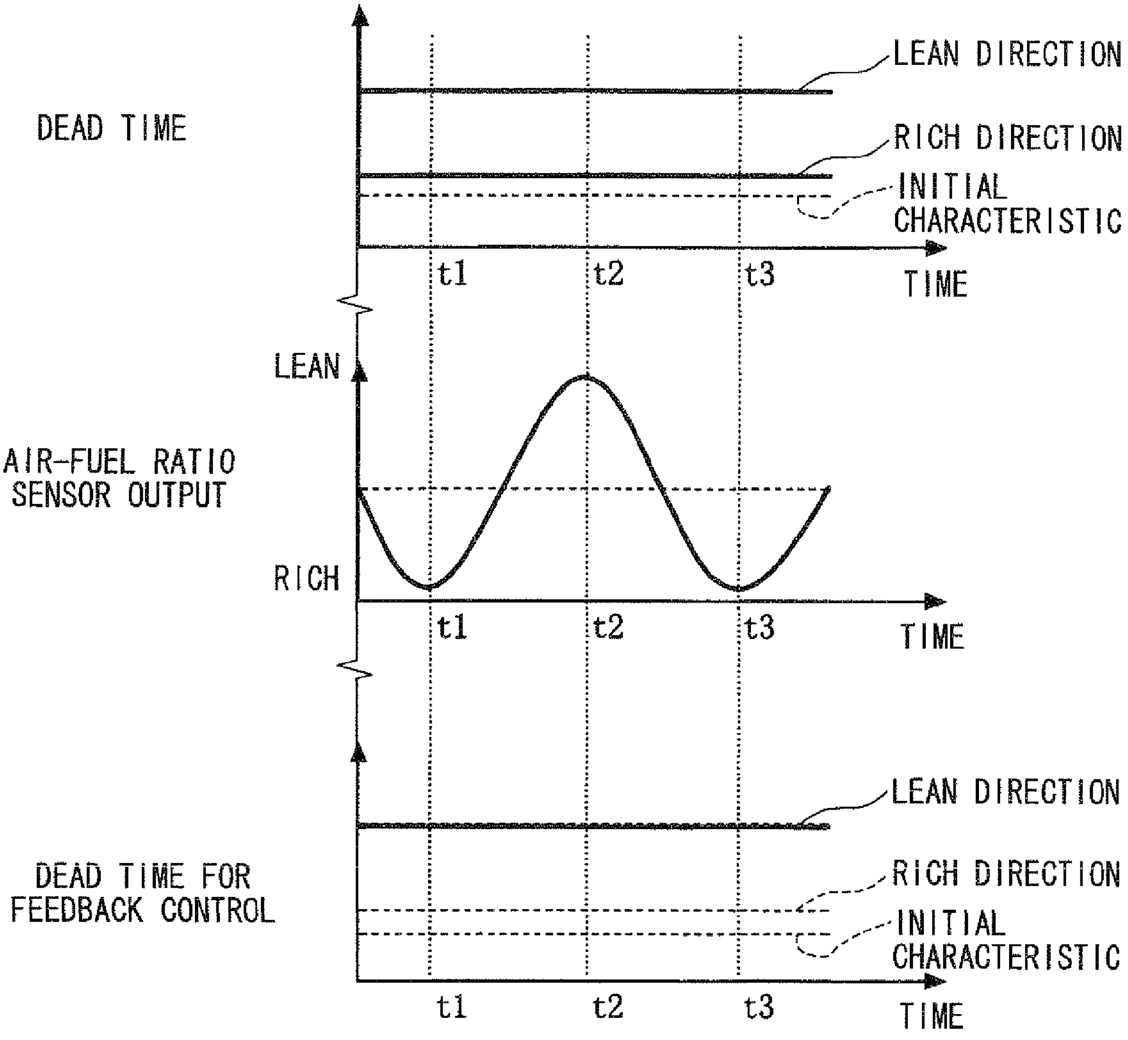
FIG. 21 is a time chart explaining a relationship between degradation of the dead time and the dead time used for feedback control according to the embodiment.

FIG. 21 is a time chart explaining a relationship between the degradation of the dead time and the dead time used for the feedback control. In regard to the degradation of the dead time, the larger one of the dead time in the lean direction and the dead time in the rich direction is invariably selected regardless of the change direction of the output of the air-fuel ratio sensor 24, and the larger dead time is used for the feedback control.

In the above-described present embodiment, in consideration of the fact that the degradation of the response characteristic of the control object occurs asymmetrically between the rich side and the lean side, the dead time in the case where the output of the air-fuel ratio sensor 24 changes from the rich side to the lean side and the dead time in the case where the output of the air-fuel ratio sensor 24 changes from the lean side to the rich side are sensed respectively. The larger one of the two sensed dead times is selected, and the number of the elements constituting the data of the past feedback correction amounts (the air-fuel ratio correction coefficients FAF(i−1) to FAF(i-d−2) and the like) used for calculating the present air-fuel ratio correction coefficient FAF(i) is changed in accordance with the larger dead time. Accordingly, it is possible to perform control for stabilizing the feedback control by increasing the number of the elements constituting the data of the past air-fuel ratio correction coefficients FAF(i−1) to FAF(i-d−2) as the degradation of the dead time advances more. As a result, deterioration of the air-fuel ratio control accuracy due to the degradation of the dead time can be reduced. The feedback correction amount (the air-fuel ratio correction coefficient FAF) can be calculated also in consideration of the asymmetric degradation of the dead time between the rich side and the lean side. Accordingly, deterioration of the air-fuel ratio control accuracy due to the asymmetric degradation of the dead time between the rich side and the lean side can be reduced.

Alternatively, in order to simplify the calculation processing, the dead time may be sensed without considering the asymmetric degradation of the dead time between the rich side and the lean side In the present embodiment, the response time in the case where the output of the air-fuel ratio sensor 24 changes from the rich side to the lean side (i.e., the lean direction response time) and the response time in the case where the output of the air-fuel ratio sensor 24 changes from the lean side to the rich side (i.e., the rich direction response time) are sensed respectively. The control gain is corrected in accordance with the lean direction response time when the output of the air-fuel ratio sensor 24 changes from the rich side to the lean side. The control gain is corrected in accordance with the rich direction response time when the output of the air-fuel ratio sensor 24 changes from the lean side to the rich side. Therefore, it is possible to correct the control gain differently between the rich side and the lean side in response to the asymmetric degradation of the response time of the air-fuel ratio sensor 24 between the rich side and the lean side. As a result, deterioration of the air-fuel ratio control accuracy due to the asymmetric degradation of the response time of the air-fuel ratio sensor 24 between the rich side and the lean side can be reduced.

The present invention is not limited to the system that controls the air-fuel ratio by the state feedback. The present invention can be implemented by applying the present invention to a system that controls the air-fuel ratio by other types of feedback control.

The present invention is not limited to the intake port injection internal combustion engine shown in FIG. 1. For example the present invention can be implemented by applying the present invention to a direct injection internal combustion engine, a dual injection internal combustion engine having both of an injector for intake port injection and an injector for direction injection, and the like.

While the invention has been described in connection with what is presently considered to be the most practical and preferred embodiments, it is to be understood that the invention is not to be limited to the disclosed embodiments, but on the contrary is intended to cover various modifications and equivalent arrangements included within the spirit and scope of the appended claims.

What is claimed is:

1. An air-fuel ratio control device of an internal combustion engine, the air-fuel ratio control device comprising:

an air-fuel ratio feedback control means for performing feedback control of a fuel quantity injected into the internal combustion engine based on a sensing value of an air-fuel ratio sensor sensing an air-fuel ratio of exhaust gas of the internal combustion engine;

a storage means for storing data of past feedback correction amounts calculated by the air-fuel ratio feedback control means in a chronological order;

a dead time sensing means for sensing a dead time necessary for change in the fuel quantity injected into the internal combustion engine to appear as change in an output of the air-fuel ratio sensor;

a response time sensing means for sensing a response time of the air-fuel ratio sensor; and a control gain correcting means for correcting a control gain of the feedback control performed by the air-fuel ratio feedback control means in accordance with the response time sensed by the response time sensing means, wherein the air-fuel ratio feedback control means calculates a present feedback correction amount by using the data of the past feedback correction amounts stored in the storage means, the sensing value of the air-fuel ratio sensor and a target air-fuel ratio, the air-fuel ratio feedback control means includes a changing means for changing the number of elements constituting the data of the past feedback correction amounts used for calculating the present feedback correction amount in accordance with the dead time sensed by the dead time sensing means, the response time sensing means senses a lean direction response time, which is a response time in the case where the output of the air-fuel ratio sensor changes from a rich side to a lean side, and a rich direction response time, which is a response time in the case where the output of the air-fuel ratio sensor changes from the lean side to the rich side, respectively, and the control gain correcting means corrects the control gain in accordance with the lean direction response time when the output of the air-fuel ratio sensor changes from the rich side to the lean side and corrects the control gain in accordance with the rich direction response time when the output of the air-fuel ratio sensor changes from the lean side to the rich side.

2. The air-fuel ratio control device as in claim 1, wherein the dead time sensing means senses the dead time in the case where the output of the air-fuel ratio sensor changes from a rich side to a lean side and the dead time in the case where the output of the air-fuel ratio sensor changes from the lean side to the rich side respectively, and the air-fuel ratio feedback control means selects the larger one of the two dead times sensed by the dead time sensing means and changes the number of the elements constituting the data of the past feedback correction amounts used for calculating the present feedback correction amount in accordance with the larger dead time.

3. The air-fuel ratio control device as in claim 1, further comprising:

a dead time degradation degree determining means for determining a degradation degree of the dead time sensed by the dead time sensing means, wherein when the degradation degree of the dead time determined by the dead time degradation degree determining means is equal to or less than a predetermined determination threshold value, the air-fuel ratio feedback control means sets the number of the elements constituting the data of the past feedback correction amounts used for calculating the present feedback correction amount to a value corresponding to an initial characteristic.

4. The air-fuel ratio control device as in claim 1, further comprising:

a response time degradation degree determining means for determining a degradation degree of each of the response times sensed by the response time sensing means, wherein when the degradation degree of the response time is equal to or less than a predetermined determination threshold value, the control gain correcting means sets the control gain to a value corresponding to an initial characteristic.

5. The air-fuel ratio control device as in claim 1, wherein the control gain correcting means determines a change direction of the output of the air-fuel ratio sensor between the rich side and the lean side based on whether a differential value or a second-order differential value of the output of the air-fuel ratio sensor is positive or negative.

6. An air-fuel ratio control device of an internal combustion engine, the air-fuel ratio control device comprising:

an air-fuel ratio feedback control means for performing feedback control of a fuel quantity injected into the internal combustion engine based on a sensing value of an air-fuel ratio sensor sensing an air-fuel ratio of exhaust gas of the internal combustion engine;

a response time sensing means for sensing a response time of the air-fuel ratio sensor;

a control gain correcting means for correcting a control gain of the feedback control performed by the air-fuel ratio feedback control means in accordance with the response time sensed by the response time sensing means; and a response time degradation degree determining means for determining a degradation degree of each of the response times sensed by the response time sensing means, wherein the response time sensing means senses a lean direction response time, which is a response time in the case where the output of the air-fuel ratio sensor changes from a rich side to a lean side, and a rich direction response time, which is a response time in the case where the output of the air-fuel ratio sensor changes from the lean side to the rich side, respectively:

the control gain correcting means corrects the control gain in accordance with the lean direction response time when the output of the air-fuel ratio sensor changes from the rich side to the lean side and corrects the control gain in accordance with the rich direction response time when the output of the air-fuel ratio sensor changes from the lean side to the rich side; and when the degradation degree of the response time is equal to or less than a predetermined determination threshold value, the control gain correcting means sets the control gain to a value corresponding to an initial characteristic.

7. An air-fuel ratio control device of an internal combustion engine, the air-fuel ratio control device comprising:

an air-fuel ratio feedback control means for performing feedback control of a fuel quantity injected into the internal combustion engine based on a sensing value of an air-fuel ratio sensor sensing an air-fuel ratio of exhaust gas of the internal combustion engine;

a response time sensing means for sensing a response time of the air-fuel ratio sensor; and a control gain correcting means for correcting a control gain of the feedback control performed by the air-fuel ratio feedback control means in accordance with the response time sensed by the response time sensing means, wherein the response time sensing means senses a lean direction response time, which is a response time in the case where the output of the air-fuel ratio sensor changes from a rich side to a lean side, and a rich direction response time, which is a response time in the case where the output of the air-fuel ratio sensor changes from the lean side to the rich side, respectively;

the control gain correcting means corrects the control gain in accordance with the lean direction response time when the output of the air-fuel ratio sensor changes from the rich side to the lean side and corrects the control gain in accordance with the rich direction response time when the output of the air-fuel ratio sensor changes from the lean side to the rich side; and the control gain correcting means determines a change direction of the output of the air-fuel ratio sensor between the rich side and the lean side based on whether a differential value or a second-order differential value of the output of the air-fuel ratio sensor is positive or negative.

8. A method of controlling an air-fuel ratio of an internal combustion engine, the method comprising:

performing air-fuel ratio feedback control of a fuel quantity injected into the internal combustion engine based on a sensing value of an air-fuel ratio sensor sensing an air-fuel ratio of exhaust gas of the internal combustion engine;

storing, in a storage medium, data of past feedback correction amounts calculated in a chronological order;

sensing a dead time necessary for change in the fuel quantity injected into the internal combustion engine to appear as change in an output of the air-fuel ratio sensor;

sensing a response time of the air-fuel ratio sensor; and correcting a control gain of the performed air-fuel ratio feedback control in accordance with the sensed response time, wherein the air-fuel ratio feedback control includes calculating a present feedback correction amount by using the data of the past feedback correction amounts stored in the storage medium, the sensing value of the air-fuel ratio sensor and a target air-fuel ratio, and the air-fuel ratio feedback control includes changing the number of elements constituting the data of the past feedback correction amounts used for calculating the present feedback correction amount in accordance with the sensed dead time, sensing the response time sensing includes sensing a lean direction response time, which is a response time in the case where the output of the air-fuel ratio sensor changes from a rich side to a lean side, and a rich direction response time, which is a response time in the case where the output of the air-fuel ratio sensor changes from the lean side to the rich side, respectively, and correcting the control gain includes correcting the control gain in accordance with the lean direction response time when the output of the air-fuel ratio sensor changes from the rich side to the lean side and correcting the control gain in accordance with the rich direction response time when the output of the air-fuel ratio sensor changes from the lean side to the rich side.

9. The method as in claim 8, wherein sensing the dead time includes sensing the dead time in the case where the output of the air-fuel ratio sensor changes from a rich side to a lean side and the dead time in the case where the output of the air-fuel ratio sensor changes from the lean side to the rich side respectively, and the air-fuel ratio feedback control includes selecting the larger one of the two sensed dead times and changing the number of the elements constituting the data of the past feedback correction amounts used for calculating the present feedback correction amount in accordance with the larger dead time.

10. The method as in claim 8, further comprising:

determining a degradation degree of the sensed dead time, wherein when the degradation degree of the determined dead time is equal to or less than a predetermined determination threshold value, the air-fuel ratio feedback control includes setting the number of the elements constituting the data of the past feedback correction amounts used for calculating the present feedback correction amount to a value corresponding to an initial characteristic.

11. The method as in claim 8, further comprising:

determining a degradation degree of each of the sensed response times, wherein when the degradation degree of the response time is equal to or less than a predetermined determination threshold value, the control gain is set to a value corresponding to an initial characteristic.

12. The method as in claim 8, wherein correcting the control gain includes determining a change direction of the output of the air-fuel ratio sensor between the rich side and the lean side based on whether a differential value or a second-order differential value of the output of the air-fuel ratio sensor is positive or negative.

13. A method of controlling an air-fuel ratio of an internal combustion engine, the method comprising:

performing air-fuel ratio feedback control of a fuel quantity injected into the internal combustion engine based on a sensing value of an air-fuel ratio sensor sensing an air-fuel ratio of exhaust gas of the internal combustion engine;

sensing a response time of the air-fuel ratio sensor;

correcting a control gain of the performed air-fuel ratio feedback control in accordance with the sensed response time; and determining a degradation degree of each of the sensed response times, wherein sensing the response time includes sensing a lean direction response time, which is a response time in the case where the output of the air-fuel ratio sensor changes from a rich side to a lean side, and a rich direction response time, which is a response time in the case where the output of the air-fuel ratio sensor changes from the lean side to the rich side, respectively;

correcting the control gain includes correcting the control gain in accordance with the lean direction response time when the output of the air-fuel ratio sensor changes from the rich side to the lean side and correcting the control gain in accordance with the rich direction response time when the output of the air-fuel ratio sensor changes from the lean side to the rich side; and when the degradation degree of the response time is equal to or less than a predetermined determination threshold value, the control gain is set to a value corresponding to an initial characteristic.

14. A method of controlling an air-fuel ratio of an internal combustion engine, the method comprising:

performing air-fuel ratio feedback control of a fuel quantity injected into the internal combustion engine based on a sensing value of an air-fuel ratio sensor sensing an air-fuel ratio of exhaust gas of the internal combustion engine;

sensing a response time of the air-fuel ratio sensor; and correcting a control gain of the performed air-fuel ratio feedback control in accordance with the sensed response time, wherein sensing the response time includes sensing a lean direction response time, which is a response time in the case where the output of the air-fuel ratio sensor changes from a rich side to a lean side, and a rich direction response time, which is a response time in the case where the output of the air-fuel ratio sensor changes from the lean side to the rich side, respectively, and correcting the control gain includes correcting the control gain in accordance with the lean direction response time when the output of the air-fuel ratio sensor changes from the rich side to the lean side and correcting the control gain in accordance with the rich direction response time when the output of the air-fuel ratio sensor changes from the lean side to the rich side; and correcting the control gain includes determining a change direction of the output of the air-fuel ratio sensor between the rich side and the lean side based on whether a differential value or a second-order differential value of the output of the air-fuel ratio sensor is positive or negative.

* * * * *